United States Patent [19]

Nakayama

[11] Patent Number: 5,553,057
[45] Date of Patent: Sep. 3, 1996

[54] AIS TRANSMISSION METHOD IN ATM COMMUNICATION SYSTEM, TRANSMISSION SIDE ATM UNIT AND ATM COMMUNICATION SYSTEM

[75] Inventor: Mikio Nakayama, Kawasaki, Japan

[73] Assignee: Fujitsu Limited, Kanagawa, Japan

[21] Appl. No.: 347,950

[22] Filed: Dec. 1, 1994

[30] Foreign Application Priority Data

Feb. 10, 1994 [JP] Japan .................................. 6-016173

[51] Int. Cl.$^6$ ............................................. H04Q 11/04
[52] U.S. Cl. ..................... 370/13; 370/60.1; 370/94.2; 370/110.1; 340/825.17
[58] Field of Search ........................ 370/60.1, 61, 79, 370/13, 14, 17, 110.1, 94.2, 60, 94.1, 58.1, 58.2; 340/825.06, 825.12, 825.14, 825.17

[56] References Cited

U.S. PATENT DOCUMENTS

| | | | |
|---|---|---|---|
| 5,253,247 | 10/1993 | Hirose et al. | 370/14 |
| 5,343,462 | 8/1994 | Sekihata et al. | 370/13 |
| 5,379,297 | 1/1995 | Glover et al. | 370/60.1 |
| 5,394,397 | 2/1995 | Yanagi et al. | 370/60.1 |
| 5,412,655 | 5/1995 | Yamada et al. | 370/60.1 |

*Primary Examiner*—Alpus H. Hsu
*Assistant Examiner*—Ricky Ngo

[57] ABSTRACT

In an ATM communication system, in order to prevent a user from an unnecessary charge due to omitting AIS (Alarm Indication Signal) transmitted/received between a transmission side ATM unit and a receiving side ATM unit when a loss of service occurs in a communication network in which existing communication lines are connected by an ATM communication unit, the transmission side ATM unit is configured to monitor a signal received from a communication line on the transmission side and to stop transmission of ATM cells to the receiving side ATM unit for a certain period of time when it detects an AIS signal indicating a loss of service on the transmission side. The receiving side ATM unit is configured to monitor the reception of the ATM cells transmitted from the transmission side ATM unit and when it recognizes that the receiving of the ATM cells is stopped for a certain period of time, it generates an AIS signal indicating the loss of service on the transmission side and sends it on the communication line on the receiving side.

19 Claims, 17 Drawing Sheets

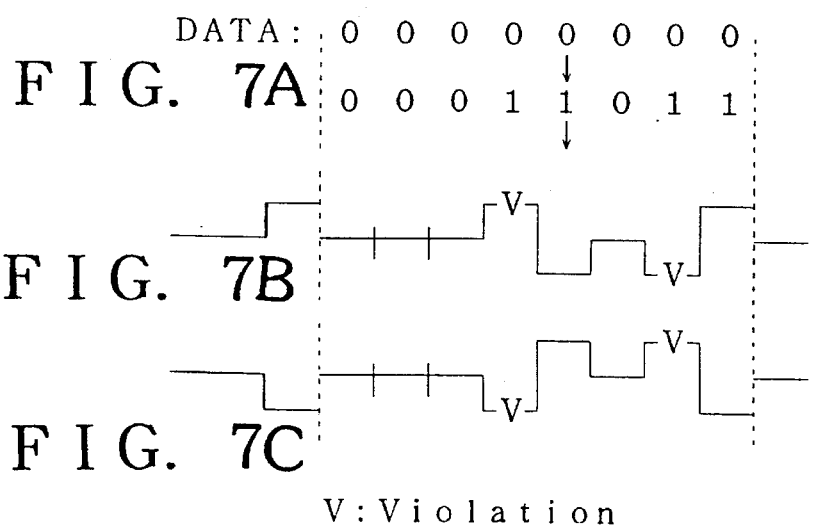
FIG. 7A
FIG. 7B
FIG. 7C
V: Violation
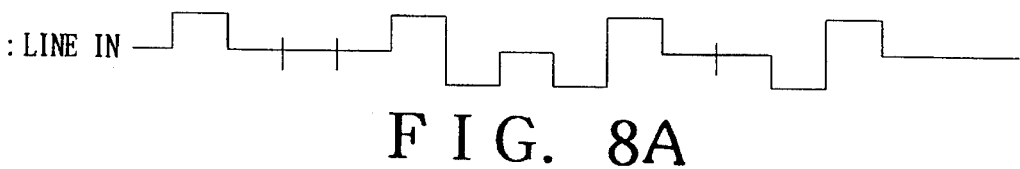
FIG. 8A
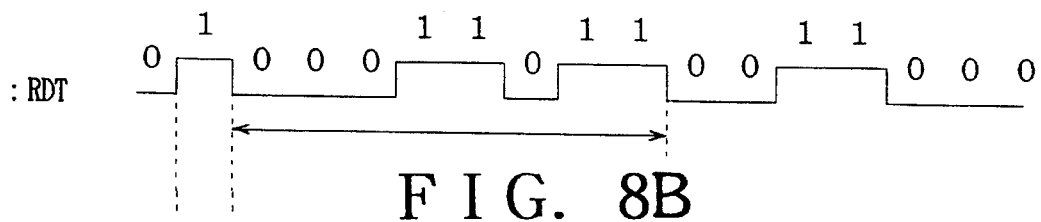
FIG. 8B
FIG. 8C
FIG. 8D
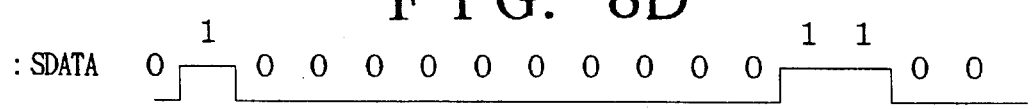
FIG. 8E

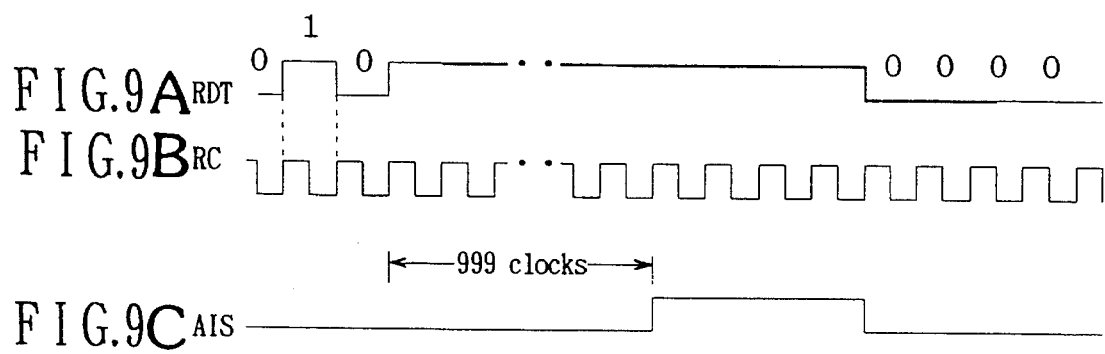
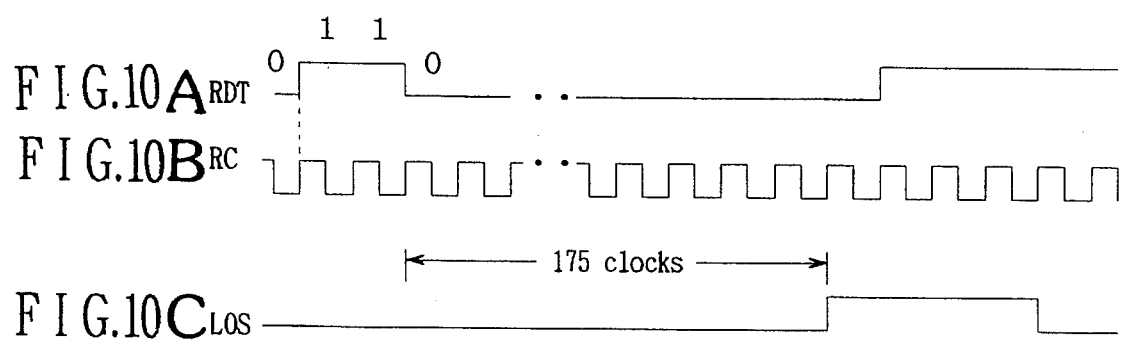
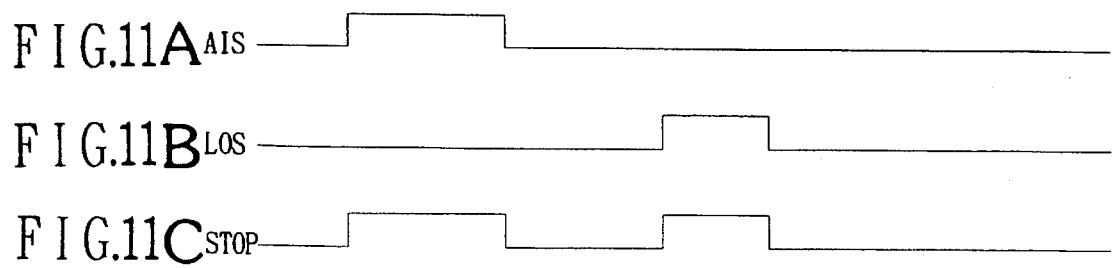

FIG. 12A SDATA
FIG. 12B SATM
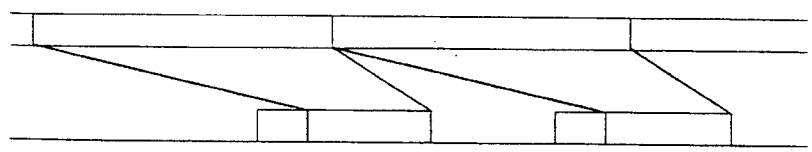
FIG. 13A SATM
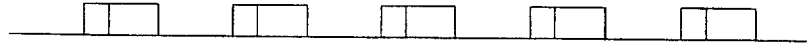
FIG. 13B STOP
FIG. 13C SUNI

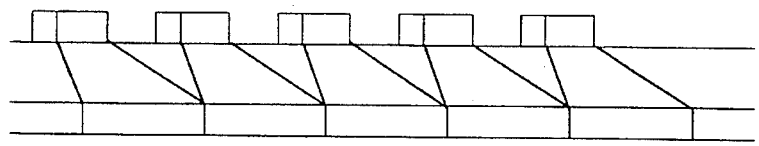
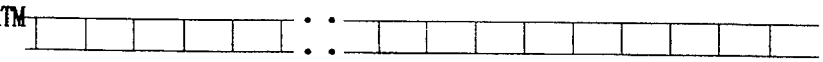
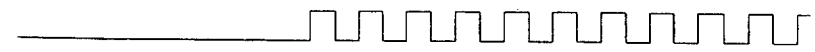
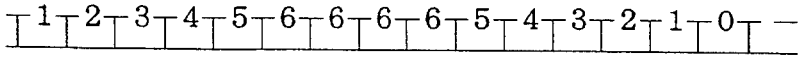
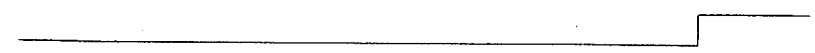

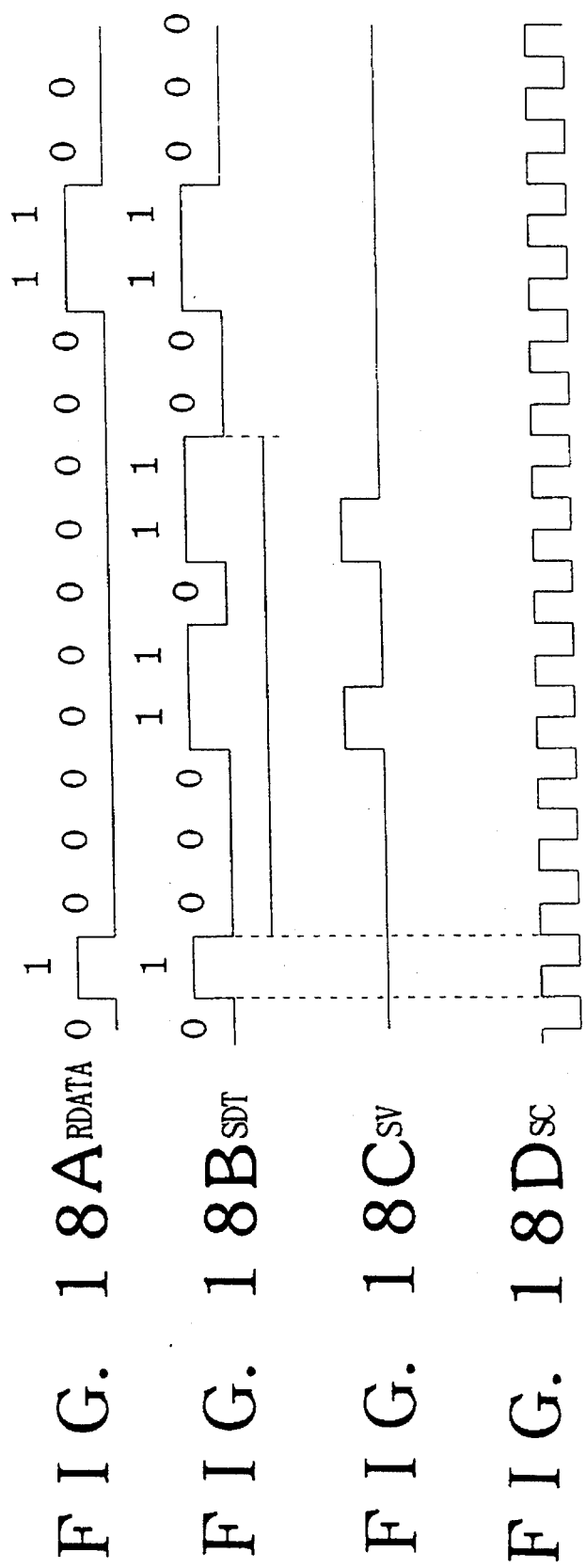

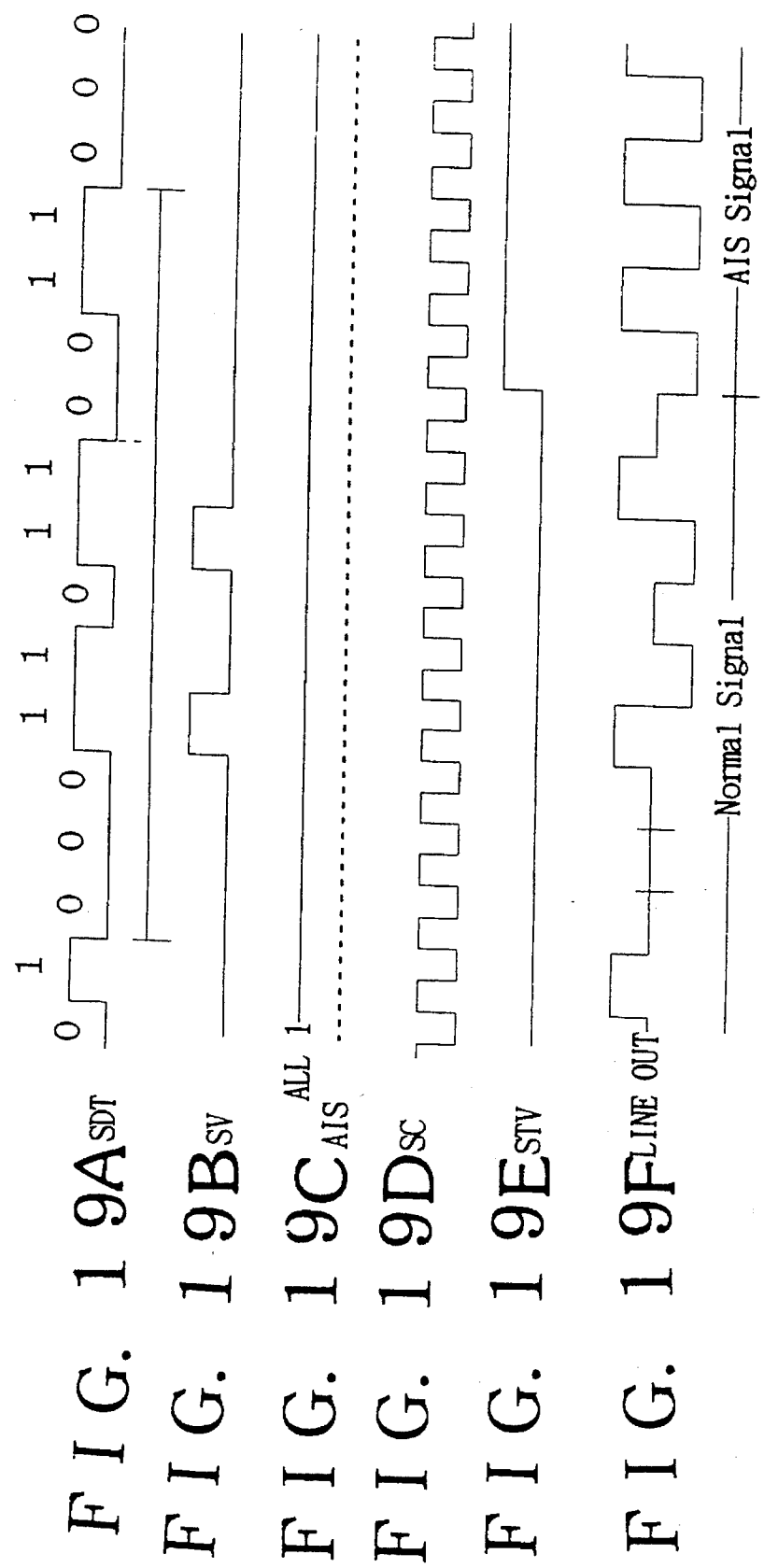

AIS TRANSMISSION METHOD IN ATM COMMUNICATION SYSTEM, TRANSMISSION SIDE ATM UNIT AND ATM COMMUNICATION SYSTEM

BACKGROUND OF THE INVENTION

1. Field of the Invention

The present invention relates to an AIS (Alarm Indication Signal) signal transmission method and a unit for informing a loss of service in a broad band ISDN and particularly in an ATM communication system in which existing communication lines are interconnected through an intermediary of ATM, and to a transmission side ATM unit and an ATM communication system.

2. Description of the Related Art

With the late diversification of information modes including voice, data and image and the increase of information amount, a broad band ISDN (Integrated Service Digital Network) is being actively developed. For the broad band ISDN, a system for connecting existing communication networks such as LAN and LAN and PBX and PBX by an ATM (Asynchronous Transfer Mode: Asynchronous Network) is being considered.

FIG. 24 shows an arrangement of a communication network in which existing communication networks are connected by the ATM. In this communication network, existing units of routers of LAN, relay stations or PBX are connected by the ATM.

ATM units 200A and 200B and an ATM switching unit lie between an existing unit 100A on the transmission side and an existing unit 100B on the receiving side. The transmission side ATM unit 200A is connected to the transmission side existing unit 100A via an interface (DS1/DS3) in DS1 (Digital Signal Level 1) or DS3 (Digital Signal Level 3). On the other hand, the receiving side ATM unit 200B is connected to the receiving side existing unit 100B via an interface (DS1/DS3).

The ATM switching unit 300 for switching ATM cells lies between the transmission side ATM unit 200A and the receiving side ATM unit 200B. Each of the ATM units 200A and 200B and the ATM switching unit 300 are connected via user interfaces (UNI).

The interface (DS1/DS3) on the transmission side transmits a DS1 or DS3 signal transmitted from the transmission side existing unit 100A to the transmission side ATM unit 200A. The transmission side ATM unit 200A converts the DS1 or DS3 signal transmitted from the interface (DS1/DS3) into ATM cells and transmits them to the receiving side via the ATM Switching unit 300.

The receiving side ATM unit 200B restores the ATM cells received via the ATM switching unit 300 into the DS1 or DS3 signal. The interface (DS1/DS3) on the receiving side transmits the DS1 or DS3 signal sent from the receiving side ATM unit 200B to the receiving side existing unit 100B.

FIG. 25 is a functional block diagram showing an internal structure of the ATM units 200A and 200B (hereinafter generally referred to as the ATM unit 200). The conventional ATM unit 200 has transmission and receiving systems. When the transmission system receives the DS1 or DS3 signal from the interface (DS1/DS3) on the transmission side, a DS1/DS3 terminating section 201 converts the DS1 or DS3 signal into a signal mode which can be processed by the ATM unit 200 and sends it to a selector 202.

The selector 202 switches an input terminal A1 and input terminal A2 and outputs data input from the DS1/DS3 terminating section 201 or data input from an AIS generating section 204 to an ATM cell generating section 203. Normally, the input path of the selector 202 is connected to the input terminal A1 to output data input from the DS1/DS3 terminating section 201 to the ATM cell generating section 203. At this time, ATM cell generating section 203 outputs the DS1 or DS3 signal by converting into ATM cells. The ATM cells are then input to the receiving side ATM unit 200B via the ATM switching unit 300 and are restored to the DS1 or DS3 signal by the ATM unit 200 to be transmitted to the receiving side existing unit 100B (See (1) in FIG. 26).

On the other hand, a LOS detecting section 205 monitors the DS1 or DS3 signal input to the DS1/DS3 terminating section 201 and detects a loss of service (LOS) when the DS1 or DS3 frame is a signal indicating "0s" successively for a certain number of bits. When the loss of service is detected, this LOS detecting section 205 outputs an instruction to the selector 202 to switch the input terminal.

Receiving the instruction, the selector 202 switches the input terminal from A1 to A2. At this time, an AIS generating section 204 outputs an AIS (Alarm Indication Signal) indicating the loss of service. The AIS signal output from the AIS generating section 204 is input to the ATM cell generating section 203 via the selector 202.

The ATM cell generating section 203 outputs the AIS signal by converting into ATM cells. This AIS signal is then transmitted to the receiving side ATM Unit 200B via the ATM switching unit 300 and to the receiving side existing unit 100B (see (3) in FIG. 26). Thereby the receiving side existing unit 100B can recognize the loss of service on the transmission side.

When the transmission side existing unit 100A transmits the AIS signal indicating the loss of service, the transmission system of the ATM unit 200 outputs the AIS signal by converting into ATM cells. The AIS signal converted into the ATM cells is then input to the receiving side ATM unit 200B via the ATM switching unit 300. Then the receiving side ATM unit 200B restores the AIS signal converted into the ATM cells to the DS1 or DS3 signal to transmit to the receiving side existing unit 100B (see (2) in FIG. 26).

Next, in the receiving system of the ATM unit 200, an ATM cell receiving section 209 receives the ATM cells transmitted from the ATM switching unit 300. The ATM cell receiving section 209 transfers the received ATM cells to a receiving buffer 208. The receiving buffer 208 temporarily stores the ATM cells input from the ATM cell receiving section 209 and appropriately outputs them.

A DS1/DS3 terminating section 207 decomposes the ATM cells output from the receiving buffer 208 to restore to the DS1 or DS3 signal. An input path of a selector 206 is normally connected with an input terminal B1 to transmit the DS1 or DS3 signal input from the DS1/DS3 terminating section 207 to the existing unit 100.

A starvation detecting section 210 monitors a number of ATM cells stored in the receiving buffer 208 and outputs to the selector 206 an instruction to switch the input paths when it detects that the number of cells is "zero" (starvation) for a specific period of time.

At this time, the AIS generating section 211 outputs an AIS signal indicating a loss of service. Then the selector 206 inputs the AIS signal output from the AIS generating section 211 via an input terminal B2 and transmits it to the existing unit 100 (see (4) in FIG. 26).

By the way, in the conventional method and system described above, because the transmission system of the ATM unit 200 outputs an AIS signal by converting into ATM cells when a loss of service occurs, the ATM cells are transmitted on the user interfaces (UNI) even if no data to be communicated exists. That is, because communication charge is made based on the number of cells transmitted on the user interfaces (UNI) in the ATM, a user is charged even for the cells of AIS signal.

SUMMARY OF THE INVENTION

Accordingly, it is an object of the present invention to prevent from making an unnecessary charge to a user by omitting AIS signals transmitted/received between a transmission side ATM unit and a receiving side ATM unit when a loss of service occurs in a communication network in which existing communication lines are connected by an ATM communication system. In order to achieve the aforementioned goal, the present invention adopts the following arrangement.

AIS Transmission Method in ATM Communication System

An AIS transmission method of the present invention is applied to an ATM communication system in which a transmission side ATM unit is disposed between a communication line on the transmission side and an ATM switching unit and a receiving side ATM unit is disposed between a communication line on the receiving side and the ATM switching unit.

The AIS transmission method includes the following steps:

(1) ATM cell generating step (2) Signal analyzing step (3) ATM cell transmission stopping step (4) ATM cell receiving step (5) ATM cell storing step (6) ATM cell decomposing step (7) Starvation detecting step (8) AIS generating step (9) Signal sending step Here the steps (1) through (3) are processing procedures to be executed by the transmission side ATM unit and the steps (4) through (7) are those to be executed by the receiving side ATM unit.

The ATM cell generating step in (1) includes a process of converting the signal transmitted from the communication line on the transmission side into fixed length ATM cells and for transmitting them to the receiving side ATM unit via the ATM switching unit.

The signal analyzing step in (2) includes a process of analyzing the signal transmitted from the communication line on the transmission side to discriminate whether it is an AIS signal indicating a loss of service on the transmission side.

The ATM cell transmission stopping step in (3) includes a process of stopping the ATM cell generating and transmitting processes for a certain period of time when the AIS signal is detected in the signal analyzing step in (2).

The ATM cell receiving step in (4) includes a process of receiving the ATM cells transmitted from the transmission side ATM unite The ATM cell storing step in (5) includes a process of temporarily storing the ATM cells received by the ATM cell receiving step in a receiving buffer and for appropriately outputting them.

The ATM cell decomposing step in (6) includes a process of decomposing the ATM cells output from the receiving buffer to restore to a signal mode transmittable on the communication line on the receiving side.

The starvation detecting step in (7) includes a process of monitoring a storing state of the receiving buffer to issue an AIS transmission command when it detects a state in which no ATM cell is stored.

The AIS generating step in (8) includes a process of generating the AIS signal indicating the loss of service on the transmission side in accordance to the AIS transmission command issued by the starvation detecting step.

The signal sending step in (9) includes a process of sending the AIS signal generated in the AIS generating step onto the communication line on the receiving side.

Here the signal analyzing step in (2) includes a process of discriminating whether the signal received from the communication line on the transmission side contains normal data. At this time, when a signal in which normal data is not stored, is detected in the signal analyzing step, the steps (3) through (8) are executed in the similar manner as described above.

Further, the signal analyzing step in (2) may comprise steps of discriminating an attribute of the signal received from the communication line on the transmission side to discriminate whether it is an AIS signal indicating a loss of service on the transmission side and issuing a cell stop command for stopping the transmission of ATM cells when the AIS signal is detected. At this time, the ATM cell transmission stopping step in (3) includes a step of stopping the generation and transmission of the ATM cells for a certain period of time when the cell stop command is issued.

Further, the signal analyzing step in (2) may comprise steps of analyzing the signal received from the communication line on the transmission side to discriminate whether normal data is stored in it and issuing a cell stop command when a signal indicating "0s" successively for a certain number of bits is detected:

Furthermore, the signal analyzing step in (2) may comprise an AIS detecting step of analyzing the signal transmitted from the communication line on the transmission side to discriminate whether it is an AIS signal indicating a loss of service on the transmission side and a LOS detecting step of analyzing the signal transmitted from the communication line on the transmission side to discriminate whether it is a signal indicating "0s" successively for a certain number of bits.

The signal sending step in (9) includes a step of sending the signal restored in the cell decomposing step onto the communication line on the receiving side when at least one ATM cell is stored in the receiving buffer. It also includes a step of stopping the transmission of the signal output from the cell decomposing step and in the same time, transmitting the AIS signal generated in the AIS generating step onto the communication line on the receiving side when no ATM cell is stored in the receiving buffer and the starvation detecting step issues the AIS sending command.

Next, an AIS transmission unit of the present invention will be explained.

AIS Transmission Unit in ATM Communication System

The AIS transmission unit of the present invention is configured by disposing a transmission side ATM unit between a communication line on the transmission side and a switching unit and by disposing a receiving side ATM unit between the switching unit and a communication line on the receiving side. The transmission side ATM unit comprises ATM cell generating means, signal analyzing means and ATM cell transmission stopping means.

The ATM cell generating means converts the signal received from the communication line on the transmission side into ATM cells and transmits them to the receiving side via the ATM switching unit.

The signal analyzing means analyzes the signal transmitted from the communication line on the transmission side to discriminate whether it is the AIS signal indicating a loss of service on the transmission side and issues a ATM cell stop command when it detects the AIS signal.

The signal analyzing means also discriminates whether normal data is stored in the signal received from the communication line on the transmission side and issues the ATM cell stop command when it detects a signal indicating "0s" successively for a certain number of bits.

The ATM cell transmission stopping means stops the generation and transmission of the ATM cells for a certain period of time when it receives the ATM cell stop command.

The ATM cell transmission stopping means also stops the operation of the ATM cell generating means for a certain period of time when the ATM cell stop command is issued from the signal analyzing means.

On the other hand, the receiving side ATM unit comprises ATM cell receiving means, receiving buffer, ATM cell decomposing means, starvation detecting step, AIS generating means and signal sending means.

The ATM cell receiving means receives the ATM cells transmitted from the transmission side ATM unit.

The receiving buffer temporarily stores the ATM cells received by the ATM cell receiving means and appropriately outputs them.

The ATM cell decomposing means decomposes the ATM cells output by the receiving buffer to restore to the signal mode transmittable on the communication line on the receiving side.

The starvation detecting means monitors the storage state of the receiving buffer and issues an AIS transmission command when it detects that no ATM cells is stored.

The AIS generating means generates the AIS signal indicating a loss of service on the transmission side in accordance to the AIS transmission command issued by the starvation detecting means.

The signal sending means sends the AIS signal generated by the AIS generating means onto the communication line on the receiving side.

Further, the signal analyzing means may comprise an AIS detecting section for monitoring the attribute of the signal transmitted from the communication line on the transmission side to detect the AIS signal indicating a loss of service on the transmission side and a LOS detecting section for monitoring the signal transmitted from the communication line on the transmission side to detect a signal indicating "0s" successively for a certain number of bits.

The signal sending means of the receiving side ATM unit sends the signal restored in the cell decomposing means onto the communication line on the receiving side when at least one ATM cell is stored in the receiving buffer. It also stops the transmission of the signal output from the cell decomposing means and in the same time, transmits the AIS signal generated in the AIS generating means onto the communication line on the receiving side when no ATM cell is stored in the receiving buffer and the starvation detecting means issues the AIS sending command.

According to the present invention, the transmission side ATM unit stops the transmission of ATM cells to the receiving side for a certain period of time when it receives the AIS signal indicating a loss of service on the transmission side from the communication line on the transmission side.

At this time, the ATM cells are deprived to zero in the receiving buffer of the receiving side ATM unit (starvation state), thereby allowing to recognize that the transmission side ATM unit has stopped to transmit ATM cells, i.e. that a loss of service has occurred. Then the receiving side ATM unit can generate the AIS signal and transmit this AIS signal onto the communication line on the receiving side, thereby allowing the receiving side to recognize the loss of service in the same manner with the conventional method.

Further, when a loss of service occurs on the communication line on the transmission side and data region of the signal transmitted from the communication line is destroyed, the transmission side ATM unit detects an abnormality of the received signal and stops the transmission of the ATM cells. Thereby the receiving side ATM unit can recognize the loss of service, generate the AIS signal and transmit on the communication line on the receiving side.

Further, when a loss of service occurs on the line connecting the transmission side ATM unit and the receiving side ATM unit and ATM cells cannot be transmitted to the receiving side ATM unit, ATM cells are deprived to zero in the receiving buffer of the receiving side ATM unit. Thereby the receiving side ATM unit can recognize the occurrence of the loss of service and transmit the AIS signal onto the communication line on the receiving side.

As described above, the AIS signal needs not be transmitted from the transmission side ATM unit to the receiving side ATM unit when a loss of service occurs on the transmission side, so that the present invention allows to prevent from making unnecessary charge to communication users. Furthermore, the AIS signal needs not be transmitted/received on the ATM network, so that the transmission band width on the ATM network may be effectively utilized.

Still more, because the present invention can execute the same sequence with the conventional one between the ATM network and existing communication networks, existing interfaces may be used.

The above and other advantages of the present invention will become more apparent in the following description and the accompanying drawings in which like numerals refer to like parts.

BRIEF DESCRIPTION OF THE DRAWINGS

FIG. 7 is a concrete example of a B8ZS signal;

FIG. 8 is a timing chart showing a processing of a terminating section of the receiving side DS1;

FIG. 9 is a timing chart showing processing of an AIS detecting section;

FIG. 10 is a timing chart showing processing of a LOS detecting section;

FIG. 11 is a timing chart showing operations of an OR circuit;

FIG. 12 is a timing chart showing processing of an ATM cell generating section;

FIG. 13 is a timing chart showing processing of an ATM cell transmission stopping section;

FIG. 15 is a timing chart showing processing of an ATM cell receiving section;

FIG. 16 is a timing chart showing processing of a receiving buffer;

FIG. 17 is a timing chart showing processing of a starvation detection section;

FIG. 18 is a timing chart showing processing of a terminating section of the transmission side DS1;

FIG. 19 is a timing chart showing processing of a selector;

FIG. 25 is a block diagram showing a structure of a conventional ATM unit per function.

DETAILED DESCRIPTION OF PREFERRED EMBODIMENTS

Figure 1:
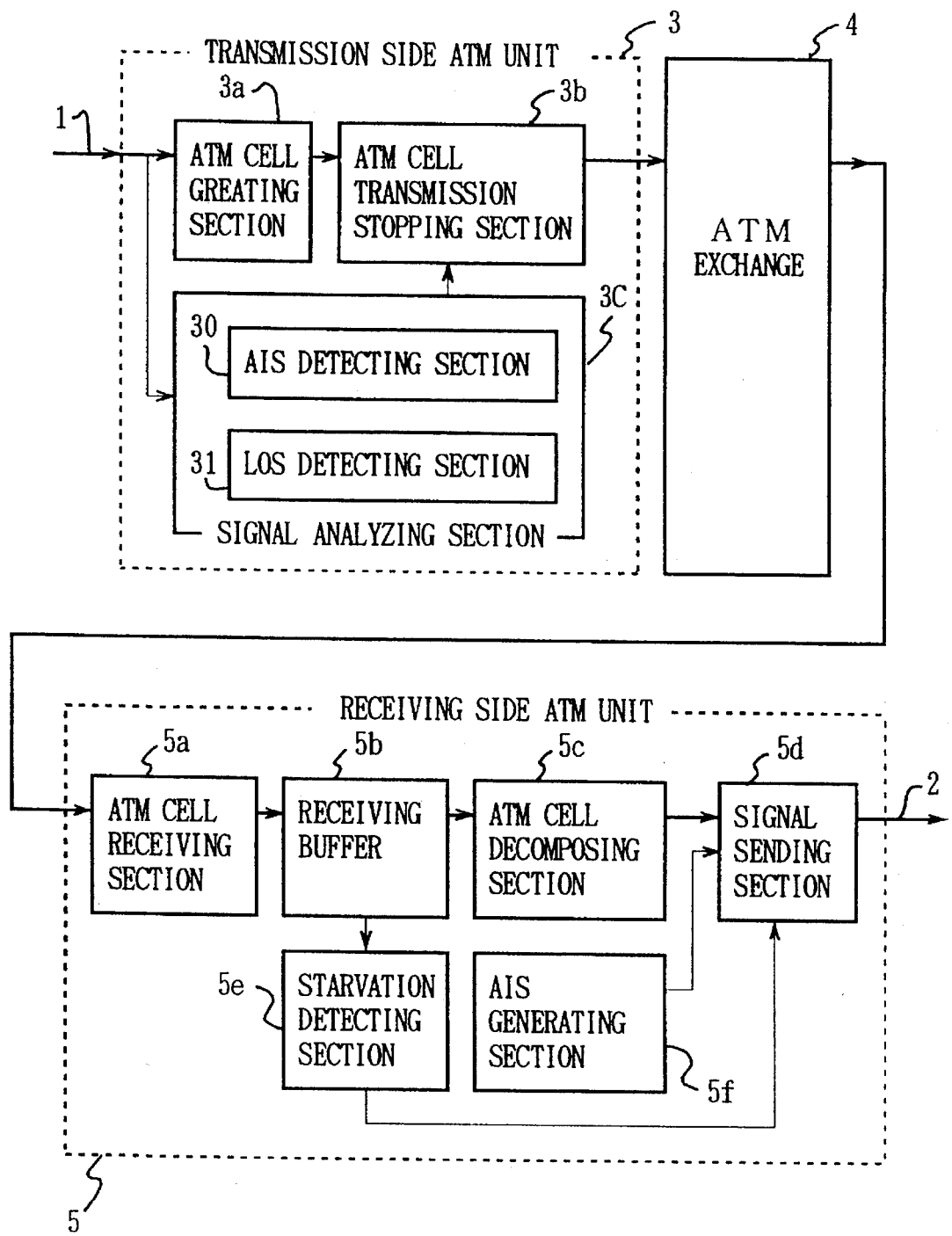
FIG. 1 is a block diagram showing a structure of an ATM communication system according to a first embodiment of the present invention.

Referring now to the drawings, preferred embodiments of the present invention will be described in detail.

First Embodiment

FIG. 1 shows a structure of an ATM communication system according to the first embodiment of the present invention. The ATM communication system comprises a transmission side ATM unit 3, an ATM switching unit 4 and a receiving side ATM unit 5.

The transmission side ATM unit 3 converts a signal transmitted from a communication line 1 on the transmission side into ATM cells and transmits them to the receiving side via the ATM switching unit 4. When an AIS signal indicating a loss of service on the transmission side is transmitted from the transmission side communication line 1, the transmission side ATM unit 3 stops the transmission of the ATM cells to the receiving side for a certain period of time.

On the other hand, the receiving side ATM unit 5 decomposes the ATM cells transmitted from the transmission side ATM unit 3 to restore to a signal mode transmittable on a communication line 2 on the receiving side and transmits the restored signal to the receiving side communication line 2. The receiving side ATM unit 5 of the present invention also has a function to monitor a receiving state of the ATM cells and to recognize that the transmission side ATM unit 3 has stopped to transmit cells. By recognizing that the transmission side ATM unit 3 has stopped the transmission, the receiving side ATM unit 5 generates an AIS signal and sends out it onto the receiving side communication line 2.

The transmission side ATM unit 3 also has a function to monitor whether correct data is stored in the signal received from the transmission side communication line 1. When correct data is not stored in the received signal, the transmission side ATM unit 3 stops the transmission of ATM cells to the receiving side ATM unit 5 for a certain period of time.

A structure of the transmission side ATM unit 3 and the receiving side ATM unit 5 will now be explained.

The transmission side ATM unit 3 may comprise a ATM cell generating section 3a, ATM cell transmission stopping section 3b and signal analyzing section 3c.

The ATM cell generating section 3a converts the signal transmitted from the transmission side communication line 1 to ATM cells and transmits them to the ATM switching unit 4.

The ATM cell transmission stopping section 3b stops the operation of the ATM cell generating section 3a for a certain period of time. That is, it has a function to stop the ATM cells generating process and ATM cells transmitting process of the ATM cell generating section 3a for a certain period of time.

The signal analyzing section 3c discriminates an attribute and normality of the signal received from the transmission side communication line 1 and issues a command to stop the transmission of cells to the ATM cell transmission stopping section 3b when it detects an AIS signal indicating a loss of service on the transmission side or a signal indicating "0s" successively for a certain number of bits.

Here the signal analyzing section 3c may comprise an AIS detecting section 30 for detecting the AIS signal and a LOS detecting section 31 for detecting the signal indicating "0s" successively for a certain number of bits.

On the other hand, the receiving side ATM unit 5 comprises an ATM cell receiving section 5a, receiving buffer 5b, ATM cell decomposing section 5c, signal transmitting section 5d, starvation detecting section 5e and AIS generating section 5f.

The ATM cell receiving section 5a receives the ATM cells transmitted from the transmission side ATM unit 3.

The receiving buffer 5b temporarily stores the ATM cells received by the ATM cell receiving section 5a and outputs the stored ATM cells with an adequate timing.

The ATM cell decomposing section 5c decomposes the ATM cells output by the receiving buffer 5b and restores to a signal mode transmittable onto the receiving side communication line 2.

The starvation detecting section 5e monitors the storage state of the receiving buffer 5b and issues a command to transmit an AIS signal when it detects no ATM cells is stored.

The AIS generating section 5f generates an AIS signal indicating a loss of service when the command to transmit the AIS signal is issued from the starvation detecting section 5e.

The signal sending section 5d transmits the signal restored by the ATM cell decomposing section 5c as well as the AIS signal generated by the AIS generating section 5f onto the receiving Side communication line 2. The signal sending section 5d transmits the signal restored by the ATM cell decomposing section 5c onto the receiving side communication line 2 when at least one ATM cell is stored in the receiving buffer 5b. The signal sending section 5d also stops the transmission of the signal restored by the ATM cell decomposing section 5c and transmits the AIS signals generated by the AIS generating section 5f onto the receiving side communication line 2 when no ATM cells is stored in the receiving buffer 5b and the starvation detecting section 5e issues the command to transmit AIS.

Now the operation of the first embodiment will be explained.

The transmission side ATM unit 3 stops the transmission of the ATM cells to the receiving side for a certain period of time when it receives the AIS signal indicating the loss of service in the transmission side from the transmission side communication line 1. At this time, no ATM cell is left in the receiving buffer 5b of the receiving side ATM unit 5 (starvation), allowing to recognize that the transmission side ATM unit 3 has stopped to transmit ATM cells, i.e. that the loss of service has occurred. Then the receiving side ATM unit 5 generates the AIS signal and transmits it onto the receiving side communication line 2, thereby allowing to recognize on the receiving side in the same manner with the conventional method that the loss of service has occurred.

Further, the signal analyzing section 3c of the transmission side ATM unit 3 detects an abnormality in the received signal and stops the transmission of the ATM cells when the loss of service has occurred on the transmission side communication line 1 and data region of the signal transmitted from the transmission side communication line 1 has been destroyed. Thereby the receiving side ATM unit 5 can recognize the occurrence of the loss of service and generate and transmit the AIS signal onto the receiving side communication line 2.

Further, when a loss of service Occurs on the line connecting the transmission side ATM unit 3 and the receiving side ATM unit 5 and no ATM cell is transmitted to the receiving side ATM unit 5, no ATM cell is left within the receiving buffer 5b of the receiving side ATM unit 5. It allows the receiving side ATM unit 5 to recognize that the loss of service has occurred and to transmit the AIS signal onto the receiving side communication line 2.

Second Embodiment

A second embodiment of the present invention will be explained with reference to the drawings.

Figure 2:
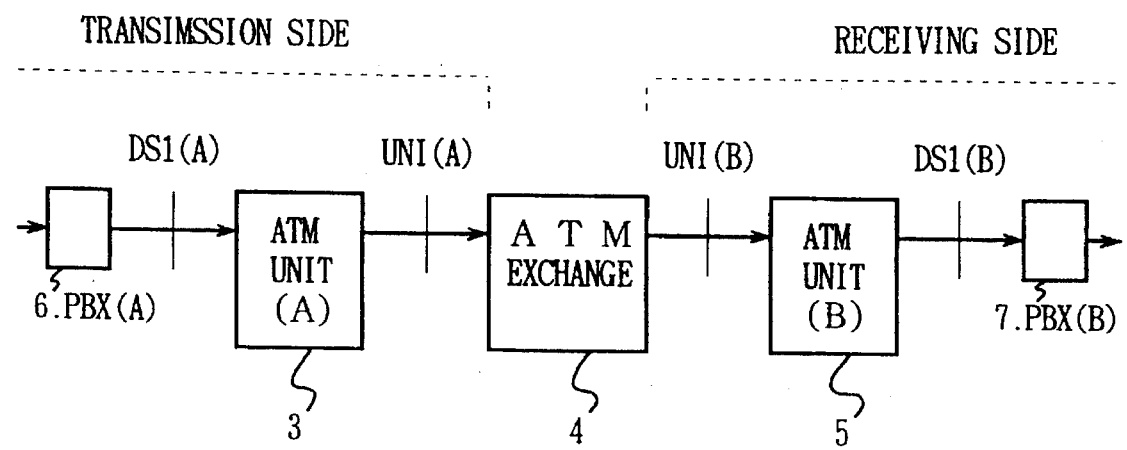
FIG. 2 is a schematic block diagram showing a structure of a communication network according to a second embodiment of the present invention.

FIG. 2 is a diagram showing one example of a communication network of the second embodiment. In the network, A PBX (X) 6 and PBX (B) 7 are connected by the ATM communication system.

The PBX (A) 6 and the ATM communication system are connected via an interface DS1 (A) and the ATM communication system and the PBX (B) 7 are connected via an interface DS1 (B).

By doing so, a DS1 signal (A) transmitted from the PBX (A) 6 (or the PBX (B) 7) is input to the ATM unit (A) 3 (or the ATM switching unit 4) is input to the ATM unit (A) 3 (or the ATM switching unit 4) via the interface DS1 (A) (or the interface DS1 (B)). In turn, the DS1 signal output from the ATM unit (A) 3 (or the ATM unit (B) 5) is transmitted to the PBX (B) 7 (or the PBX (A) 6) via the interface DS1 (B) (or the interface DS1 (A)).

The ATM communication system comprises the ATM unit (A) 3, the ATM switching unit 4, the ATM unit (B) 5, wherein the ATM unit (A) 3 and the ATM switching unit 4 are connected via an user interface UNI (A) and the ATM switching unit 4 and the ATM unit (B) 5 are connected via an user interface UNI (B). A charge for using the ATM communication network is billed based on a number of cells passing through the user interface UNI on the receiving side. By the way, the present embodiment will be explained exemplifying an ATM communication system which receives AAL type 1 ATM cells.

Figure 3:
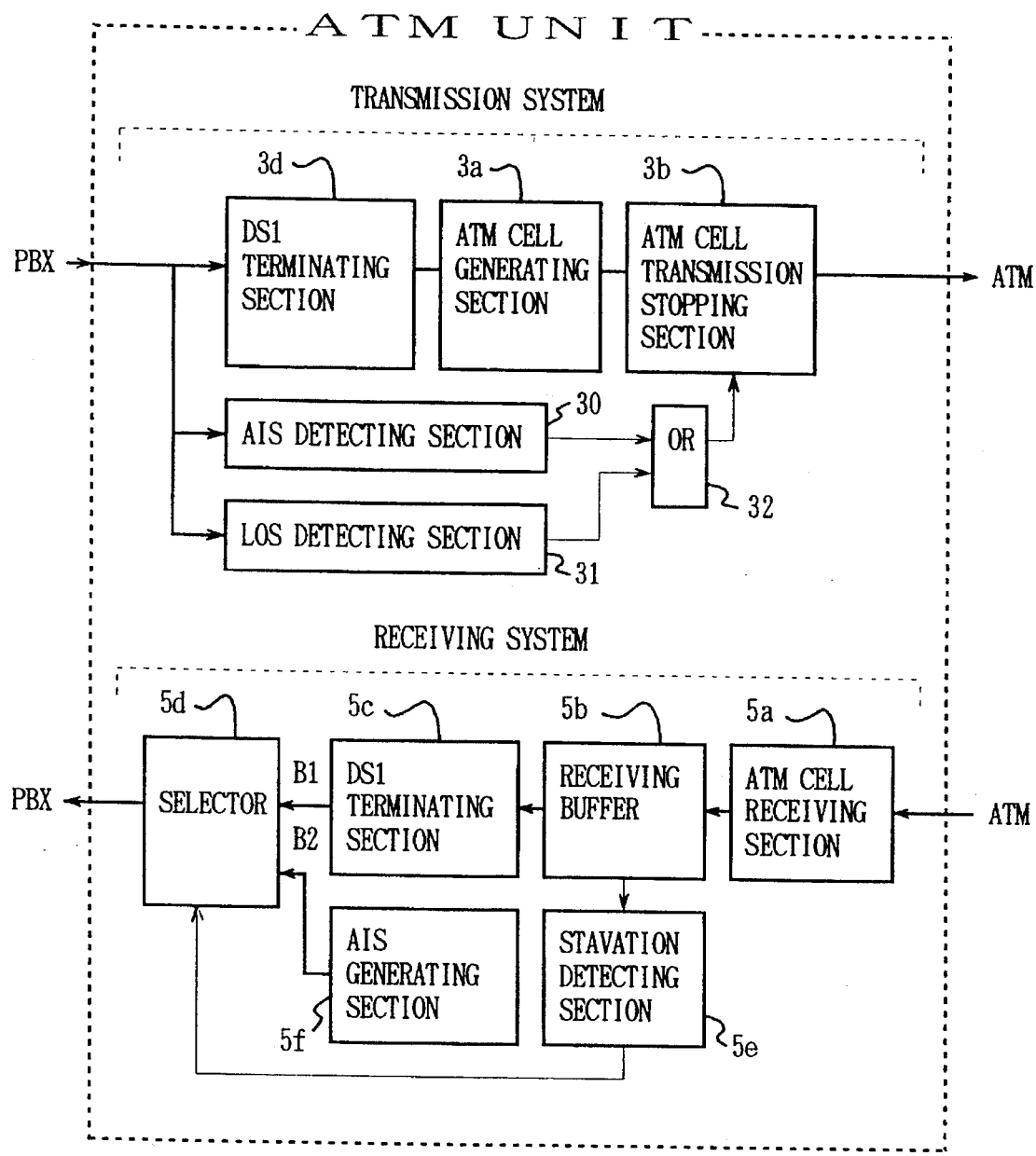
FIG. 3 is a block diagram showing a functional structure of an ATM unit according to the second embodiment.

FIG. 3 is a functional block diagram of the internal structure of the ATM unit 3 and the ATM unit (B) 5 (hereinafter generally referred to as the ATM unit) of the second embodiment.

The ATM unit comprises transmission and receiving systems. The transmission system comprises a DS1 terminating section 3d, ATM cell generating section 3a, ATM cell transmission stopping section 3b, AIS detecting section 30, LOS detecting section 31 and OR circuit.

The DS1 terminating section 3d converts the DS1 signal transmitted from the PBX (A) 6 (or the PBX (B) 7) into a signal mode processible by the ATM unit and outputs to ATM cell generating section 3a.

The ATM cell generating section 3a divides the signal output from the DS1 terminating section 3d to generate ATM cells.

Figure 4:
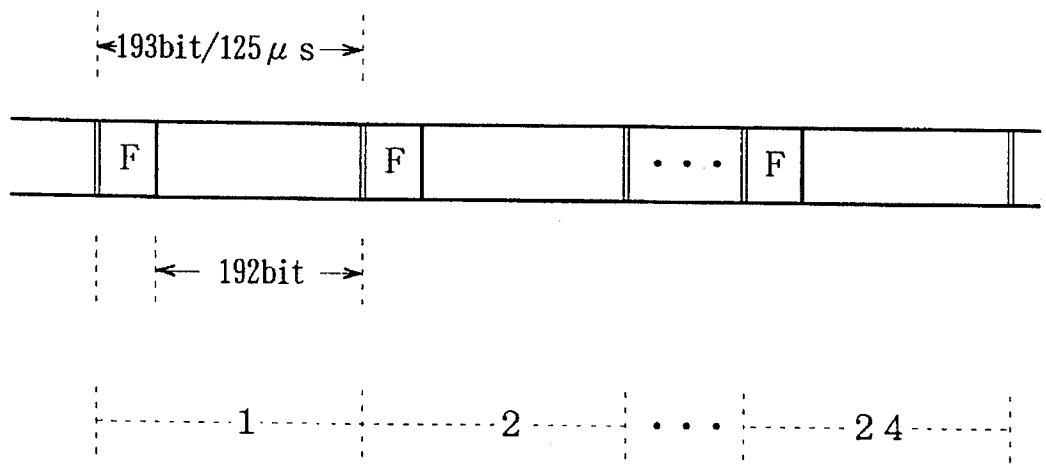
FIG. 4 is a diagram showing a frame structure of a DS1 signal.
Figure 5:
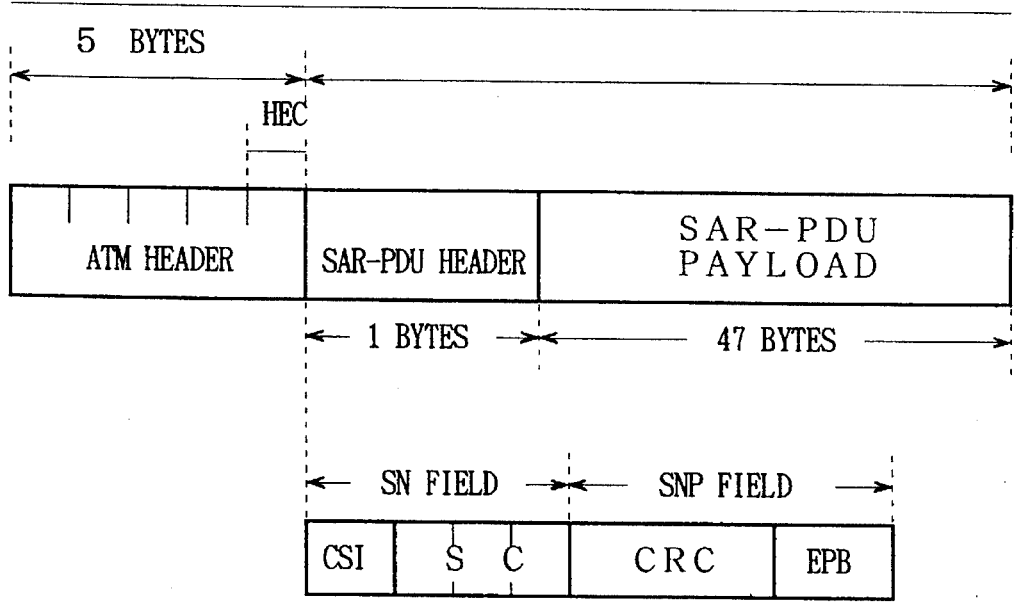
FIG. 5 is a diagram showing a structure of an ATM cell.

In concrete, the DS1 signal has a multi-frame structure in which 24 frames each comprising one bit F bit region and 192 bits data region, i.e. 193 bits length, are combined (in total 4,632 bits) (see FIG. 4) and the AAL type 1 ATM cell has 53 bytes comprising 5 bytes ATM header region, 1 byte SAR-PDU header region and 47 bytes SAR-PDU payload region (see FIG. 5). Due to that, ATM cell generating section 3a generates the ATM cell by dividing the data region of the DS1 signal per each 47 bytes to store in the SAR-PDU payload region and by adding the SAR-PDU header and ATM header with it.

The AIS detecting section 30 monitors the DS1 signal input to the DS1 terminating section 3d and detects the AIS signal indicating an occurrence of loss of service in the PBX (A) 6 (or the PBX (B) 7). In concrete, the AIS signal conforming to the DS1 is a signal which has no frame and in which the value of bits composing the signal indicates "1" in 99.9%. Accordingly, the AIS detecting section 30 monitors the signal input to the DS1 terminating section 3d at least by 1,000 bits and recognizes that the signal is the AIS signal when it detects a signal in which more than 999 bits out of those 1,000 bits indicate "1". Detecting the AIS signal, the AIS detecting section 30 outputs a request to stop the transmission of cells to the ATM cell transmission stopping section 3b.

The LOS detecting section 31 also monitors the normality of the DS1 signal input to the DS1 terminating section 3d and discriminates whether an abnormality has occurred on the line connecting the PBX (A) 6 (or the PBX (B) 7) and the ATM unit. In concrete, when an abnormality occurs on the line connecting the PBX (A) 6 (or the PBX (B) 7) and the ATM unit, the DS1 signal becomes LOS state in which "0" is indicated successively for 100 to 250 bits. Due to that, the LOS detecting section 31 monitors the DS1 signal input to the DS1 terminating section 3d successively at least by 100 to 250 bits and recognizes the LOS state when all the values of those 100 to 250 bits are "0". Recognizing the LOS state, the LOS detecting section 31 outputs a request to stop the transmission of cells to the ATM cell transmission stopping section 3b.

While the ATM cell transmission stopping section 3b normally sends out the ATM cells generated in ATM cell generating section 3a to the ATM switching unit 4 as they are, it stop the cell generating process and cell transmitting process of ATM cell generating section 3a for a certain period of time. That is, when it receives the request to stop the transmission of cells from either the AIS detecting section 30 or the LOS detecting section 31, it stops the cell generating process and cell transmitting process of ATM cell generating section 3a for the certain period of time.

Next, functions of the receiving system of the ATM unit will be explained.

The receiving system comprises an ATM cell receiving section 5a, receiving buffer 5b, DS1 terminating section 5c, selector 5d, starvation detecting section 5e and AIS generating section 5f.

The ATM cell receiving section 5a receives the ATM cells transmitted from the ATM unit of the sender and transfers them to the receiving buffer 5b.

The receiving buffer 5b temporarily stores the ATM cells transferred from the ATM cell receiving section 5a and outputs them in accordance to the request from the DS1 terminating section 5c.

The DS1 terminating section 5c is a concrete example of the ATM cell decomposing section of the present invention which decomposes the ATM cells output from the receiving buffer 5b to restore the frame structure of the DS1 signal.

The starvation detecting section 5e monitors a number of ATM cells stored in the receiving buffer 5b and when the number of ATM cells becomes zero (starvation state), outputs a request to transmit the AIS signal to the selector 5d as well as a request to generate the AIS signal to the AIS generating section 5f.

The AIS generating section 5f generates the AIS signal when it receives the request from the starvation detecting section 5e and outputs the AIS signal to the selector 5d.

The selector 5d comprises two input terminals B1 and B2 and one output terminal and has a function to switch among the connection of the input terminal B1 and the output terminal and that of the input terminal B2 and the output terminal. By the way, the DS1 terminating section 5c is connected to the input terminal B1 and the AIS generating section 5f is connected to the input terminal B2. Normally, the selector 5d connects the input terminal B1 and the output terminal and transmits the DS1 signal output from the DS1 terminating section 5c to the PBX (A) 6 (or the PBX (B) 7). On the other hand, receiving the AIS transmission request from the starvation detecting section 5e, the selector 5d cut off the connection between the input terminal B1 and the output terminal and connects the input terminal B2 and the output terminal. Then the selector 5d transmits the AIS signal output from the AIS generating section 5f to the PBX (A) 6 (or the PBX (B) 7).

Next, a structure of each part section described above will be explained in detail.

Figure 6:
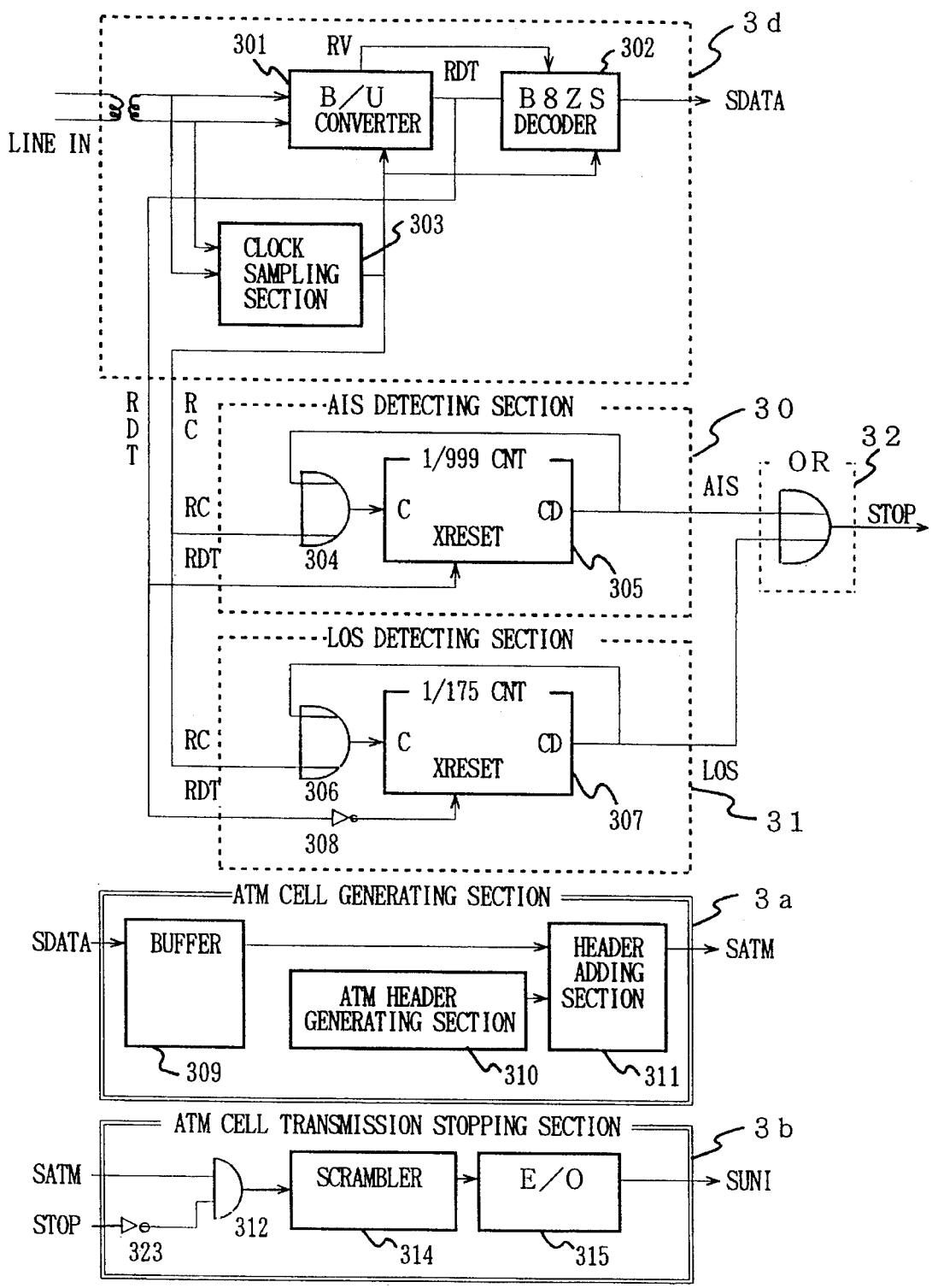
FIG. 6 is a diagram showing a hardware structure of the transmission system.

FIG. 6 is a diagram showing a hardware structure of the transmission system according to the second embodiment.

The terminating section 3d of the receiving side DS1 comprises a B/U converting circuit (bipolar/unipolar converting section) 301, B8ZS decoder 302 and clock sampling section 303.

According to the present embodiment, when successive eight data values are "0", the PBX transmits this data as a B8ZS signal. This B8ZS signal is a bipolar pulse signal which is what the eight successive data "0, 0, 0, 0, 0, 0, 0, 0" are code inverted into "0, 0, 0, 1, 1, 0, 1, 1" and violations are added (see FIG. 7).

Here, the clock sampling section 303 has a function to detect clocks RC from the bipolar signal LINE IN input from the PBX (see FIG. 8d). Then, the clock sampling section 303 inputs the clocks RC to the B/U converting section 301, B8ZS decoder 302, AIS detecting section 30 and LOS detecting section 31.

The B/U converting section 301 has functions to covert the bipolar signal LINE IN (see FIG. 8a) received from the PBX into an unipolar signal RDT (see FIG. 8b) and to detect violations RV (see FIG. 8c) from the bipolar signal.

The B/U converting section 301 inputs the code signal RDT after the conversion and the violations RV to the B8ZS decoder 302 and in the same time, inputs the code signal (RDT) to the LOS detecting section 31.

The B8ZS decoder 302 restores the code signal RDT input from the B/U converting section 301 into the original signal "0, 0, 0, 0, 0, 0, 0, 0" (see FIG. 8e) and inputs the restored signal SDATA to the ATM cell generating section 3a.

The AIS detecting section 30 comprises an OR circuit 304 and counter 305. The counter 305 updates a counter value when a data value of the unipolar signal RDT input from the terminating section 3d of the receiving side DS1 is "1" and resets the counter value if the data value of the unipolar signal is "0". Then, when the counter value becomes "999", i.e. successive 999 clocks RC are input while the data value is "1", the counter 305 outputs the AIS signal to the OR circuit 32 (see FIG. 9).

The LOS detecting section 31 comprises an OR circuit 306, counter 307 and inverter 308.

The counter 307 inputs the unipolar signal RDT input from the B/U converting section 301 via the inverter 308. Then, the counter 307 updates the counter value if the data value is "1" and resets the counter value when the data value is "0". When the data value of the unipolar signal RDT is "1", the inverter 308 converts the data value "1" to "0" and inputs it to the counter 307. At this time, the counter 307 resets the counter value.

On the other hand, when the data value is "0", the inverter 308 converts the data value "0" to "1" and inputs it to the counter 307. At this time, the counter 307 updates the counter value. Then, when successive 175±75 clocks RC are input while the data value is "1", i.e., successive 175±75 data values "0" of the unipolar signal are input, the counter 307 outputs the LOS signal to the OR circuit 32 (see FIG. 10).

When the AIS signal is input from the AIS detecting section 30 and when the LOS signal is input from the LOS detecting section 31, the OR circuit 32 transmits the cell transmission stop signal to the ATM cell transmission stopping section 3b (see FIG. 11).

The ATM cell generating section 3a comprises a buffer 309, ATM header generating section 310 and header adding section 311.

The buffer 309 stores data SDATA input from the terminating section 3d of the receiving side DS1. Then, when fixed length data is stored in the buffer 309, the header adding section 311 adds an ATM header generated by the ATM header generating section 310 to this fixed length data (see FIG. 12).

The ATM cell transmission stopping section 3b comprises an AND circuit 312, inverter 313, scrambler 314 and E/O (Electrical/Optical) transducing section 315.

The AND circuit 312 operates a logical product of a signal SATM from the ATM cell generating section 3a and a signal from the inverter 313.

When the inverter 313 receives the cell transmission stop signal from the OR circuit 32, it converts this signal to "0" and inputs it to the AND circuit 312. At this time, the output of the AND circuit 312 becomes "0" (see FIG. 13). Thereby, the transmission of the ATM cell is stopped. The output of the AND circuit 312 is further output to the ATM network via the scrambler 314 and E/O circuit 315.

Figure 14:
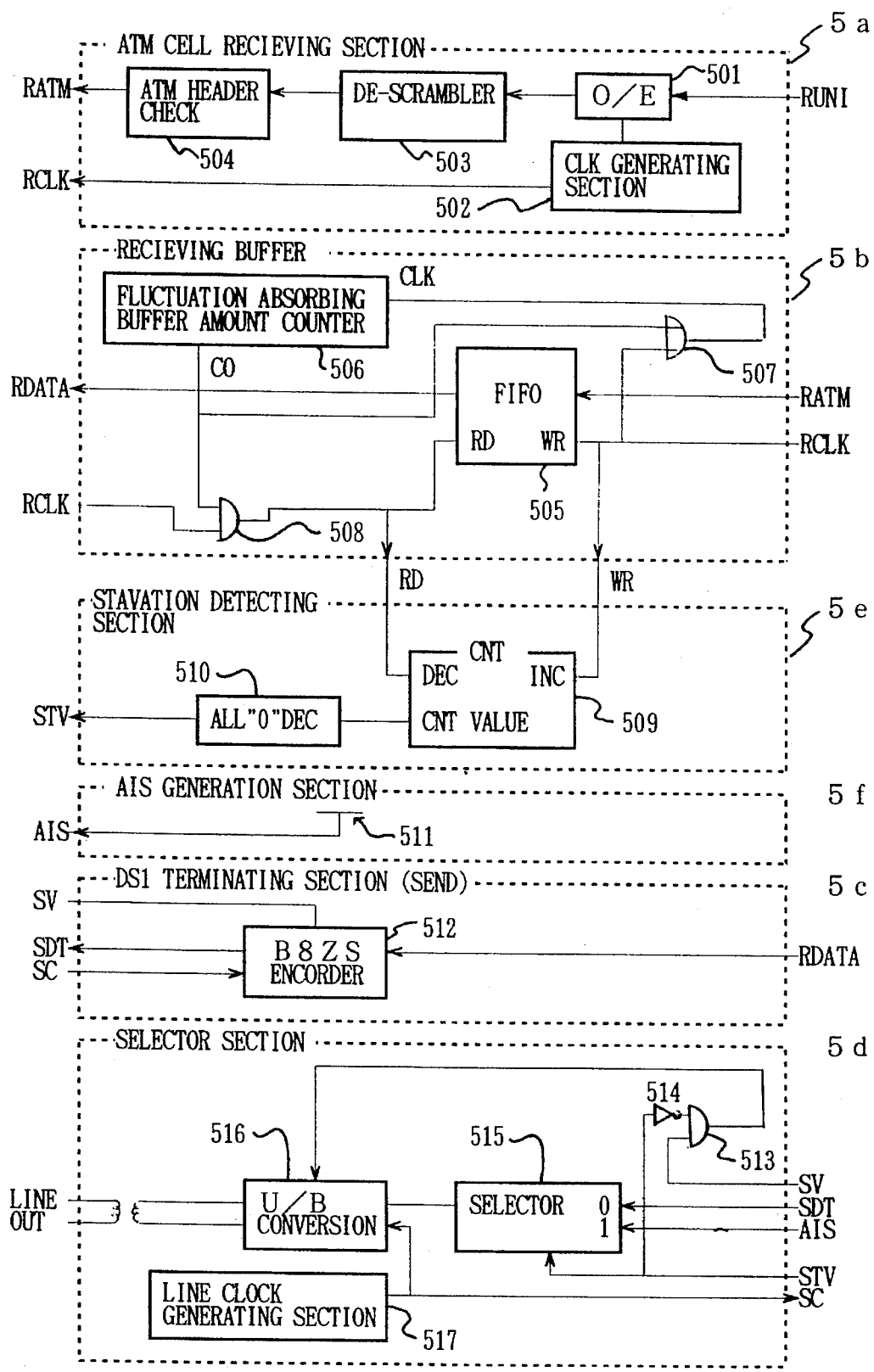
FIG. 14 is a diagram showing a hardware structure of the receiving system;.

FIG. 14 shows a hardware structure of the receiving system according to the second embodiment.

The ATM cell receiving section 5a comprises an 0/E (Optical/Electrical) transducing section 501, clock generating section 502, de-scrambler 503 and ATM header checking section 504.

An optical signal RUNI transmitted from the transmission system is input to the ATM header checking section 504 via the O/E transducing section 501 and de-scrambler 503.

The ATM header checking section 504 has functions to remove the ATM header from the ATM cell and to output data of the payload section as successive data RATM (see FIG. 15).

The clock generating section 502 generates clocks RCLK of the receiving system based on the optical signal RUNI. This clock RCLK is input to the receiving buffer 5b.

The receiving buffer 5b comprises a FIFO 505, fluctuation absorbing buffer amount counter 506, OR circuit 507 and AND circuit 508.

The FIFO 505 stores the data RATM from the ATM cell receiving section 5a up to a predetermined amount. The clock RCLK is input to the FIFO 505 as a write pulse. Thereby, the FIFO 505 writes the data RATM sequentially in accordance to the write pulse.

The clock RCLK is also input to the fluctuation absorbing buffer amount counter 506 via the OR circuit 507. The fluctuation absorbing buffer amount counter 506 then counts the clocks RCLK and when the counter value reaches to the predetermined value, it recognizes that the predetermined amount of data is being stored in the FIFO 505. When the predetermined amount of data (N 47 byte data) is stored in the FIFO 505, an output CO of the fluctuation absorbing buffer amount counter 506 is fixed to "H". This output CO "H" is input to the AND circuit 508 and OR circuit 507.

The AND circuit 508 executes a logical product of the read enable signal CO and clock SC for transmitting data and inputs the result to the FIFO 505. Then, when the output of the fluctuation absorbing buffer amount counter 506 is fixed to "H", an output of the AND circuit 508 becomes the same value with the clock SC. Thereby, the FIFO 505 reads data in accordance to the clock SC for transmitting data and inputs this data RDATA to the terminating section 5c of the transmission side DS1 (see FIG. 16).

The starvation detecting section 5e comprises a counter 509 and ALL "0" decoder 510. The counter 509 is connected with the write clock and read clock of the FIFO 505. The counter 509 increments the counter value when the write clock is input and decrements the counter value when the read clock is input.

The ALL "0" decoder 510 outputs the starvation signal STV to the selector 5d when the counter value of the counter 509 becomes "0" (see FIG. 17).

That is, when a starvation is caused, the data amount in the FIFO 505 becomes "0" and the counter value of the counter 509 becomes "0".

The AIS generating section 5f includes a 5-volt power source 511. That is, this 5-volt power source 511 outputs a 5-volt electrical signal always. This electrical signal is a signal logically representing "1", and indicating AIS signal in the case of DS1.

The terminating section 5c of the transmission side DS1 includes a B8ZS encoder 512. The output data RDATA from the receiving buffer 5b and the clock SC for transmitting data are input to the B8ZS encoder 512.

When values of the data RDATA are "0" successively by eight, the B8ZS encoder 512 converts this data into "0, 0, 0, 1, 1, 0, 1, 1" and produces violation signals SV. Then, the B8ZS encoder 512 outputs data SDT after the conversion and the violation signals SV to the selector 5d in accordance to the transmission side clocks (see FIG. 18). The violation signal SV is a signal indicating a position to which the violation is to be added.

The selector 5d comprises an AND circuit 513, inverter 514, selector 515, U/B converting section 516 and line clock generating section 517.

The line clock generating section 517 generates a clock SC for transmission. This clock SC is input to the U/B converting section 516, receiving buffer 5b and terminating section 5c of the transmission side DS1.

The output data SDT of the B8ZS encoder 512, the AIS signal from the AIS generating section 5f and the starvation signal STV from the starvation detecting section 5e are input to the selector 515.

When the signal STV from the starvation detecting section 5e is "0", the selector 515 outputs the output data SDT from the terminating section 5c of the transmission side DS1 to the U/B converting section 516. When the signal STV from the starvation detecting section 5e is "1", the selector 515 outputs the signal AIS from the AIS generating section 5f to the U/B converting section 516.

When the signal STV is "0", it is converted by the inverter 514 to "1" and is input to the AND circuit 513. When the AND circuit 513 inputs the signal "1" from the inverter 514, it inputs the violation signal SV to the U/B converting section 516 as it is.

Then, the U/B converting section 516 converts the data SDT output from the selector 515 from the unipolar signal to the bipolar signal and adds the violation following to the violation signal SV.

On the other hand, when the starvation signal STV becomes "1", it is converted by the inverter 514 to "0" and is input to the AND circuit 513. When the signal "0" is input from the inverter 514, the AND circuit 513 stops the output of the violation signal SV (see FIG. 19).

Now the operation steps of the ATM unit of the second embodiment will be explained. Here the explanation will be made exemplifying a case in which the signal from the PBX (A) 6 is transmitted to the PBX (B) 7.

The signal transmitted from the PBX (A) 6 is transmitted to the ATM unit (A) 3 via the interface DS1 (A). In the ATM unit (A) 3, the DS1 terminating section 3d receives the signal transmitted from the interface DS1 (A). At this time, the AIS detecting section 30 discriminates whether the signal received by the DS1 terminating section 3d is an AIS signal or not and in the same time, the LOS detecting section 31 monitors the signal to discriminates whether it is normal or not.

If the signal received by the DS1 terminating section 3d is not an AIS signal and data region of the signal is normal, ATM cell generating section 3a divides the signal output from the DS1 terminating section 3d into units of 47 bytes to generate ATM cells. Then ATM cell generating section 3a outputs the generated ATM cells to the ATM cell transmission stopping section 3b. The ATM cell transmission stopping section 3b transmits the ATM cells output from ATM cell generating section 3a to the ATM switching unit 4 as they are.

The ATM switching unit 4 refers to an ATM header of the ATM cells transmitted from the ATM unit (A) 3 to discriminate an address. When the address of the ATM cells is the ATM unit (B) 5, the ATM switching unit 4 transmits the ATM cells to the ATM unit (B) 5.

In the ATM unit (B) 5, the ATM cell receiving section 5a receives the ATM cells transmitted from the ATM switching unit 4. The 5a then transfers the received ATM cells to the receiving buffer 5b.

The receiving buffer 5b temporarily stores the ATM cells transferred from the ATM cell receiving section 5a. It then outputs the ATM cells in accordance to a request from the DS1 terminating section 5c.

The DS1 terminating section 5c decomposes the ATM cells output from the receiving buffer 5b to restore the frame structure of the DS1 and outputs to the selector.

Here the starvation detecting section 5e discriminates whether a number of ATM cells stored in the receiving buffer 5b is "zero" or not. If the number of ATM cells stored in the receiving buffer 5b is not zero, the selector 5d and the AIS generating section 5f do not operate. Then the selector 5d transmits the DS1 signal output from the DS1 terminating section 5c to the interface DS1 (B).

Figure 23:
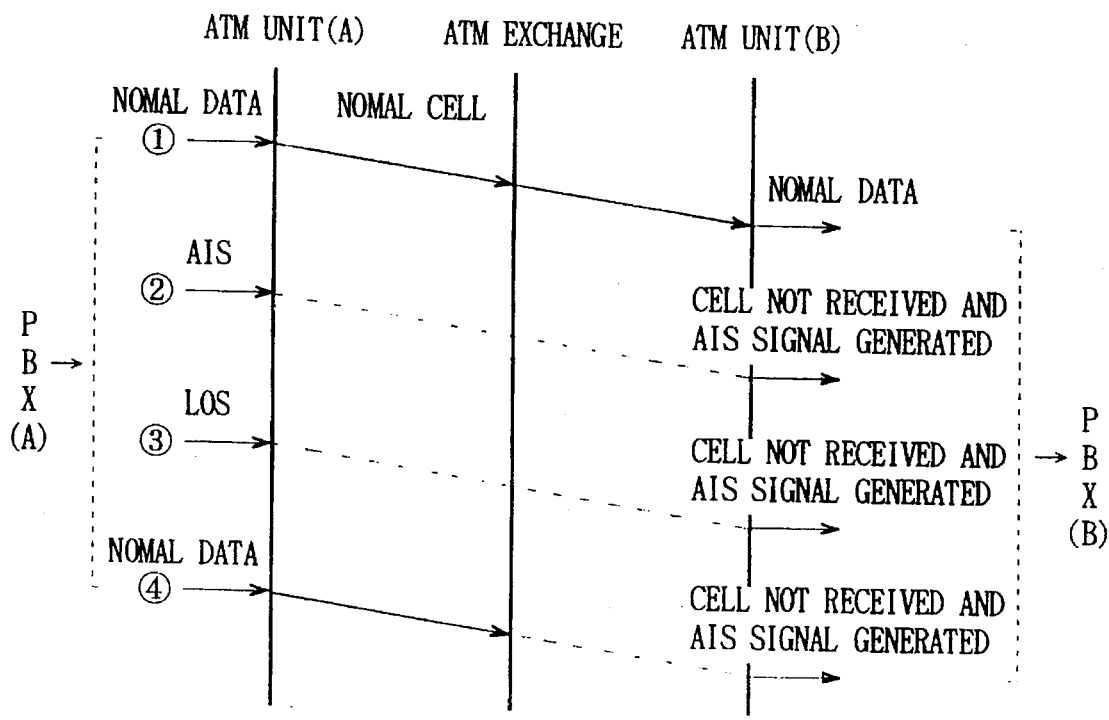
FIG. 23 is a diagram showing transmission sequences of signals in the second embodiment.
Figure 24:
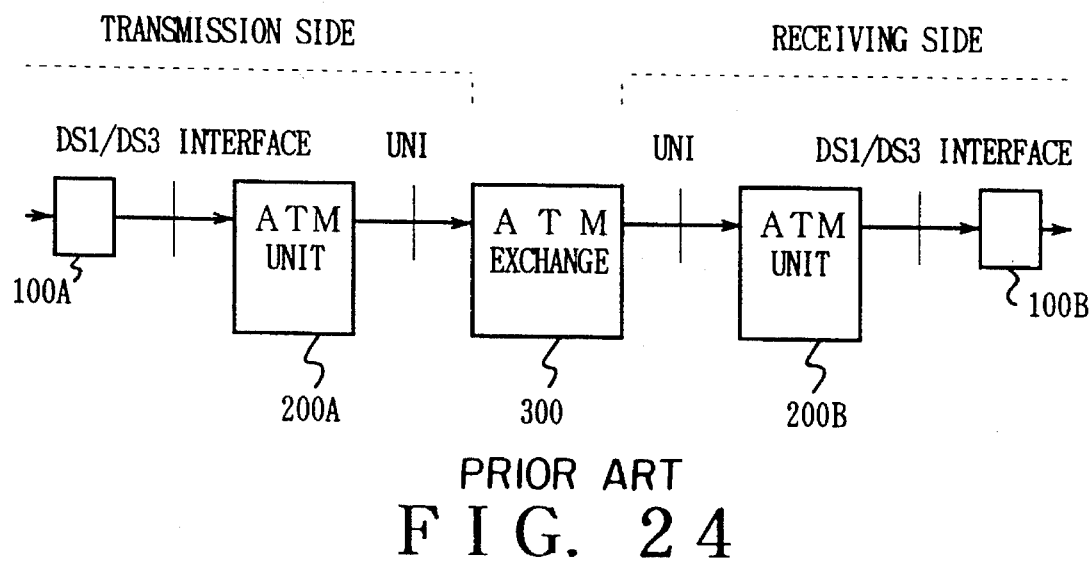
FIG. 24 is a schematic block diagram showing a structure of a conventional communication network.
Figure 2:
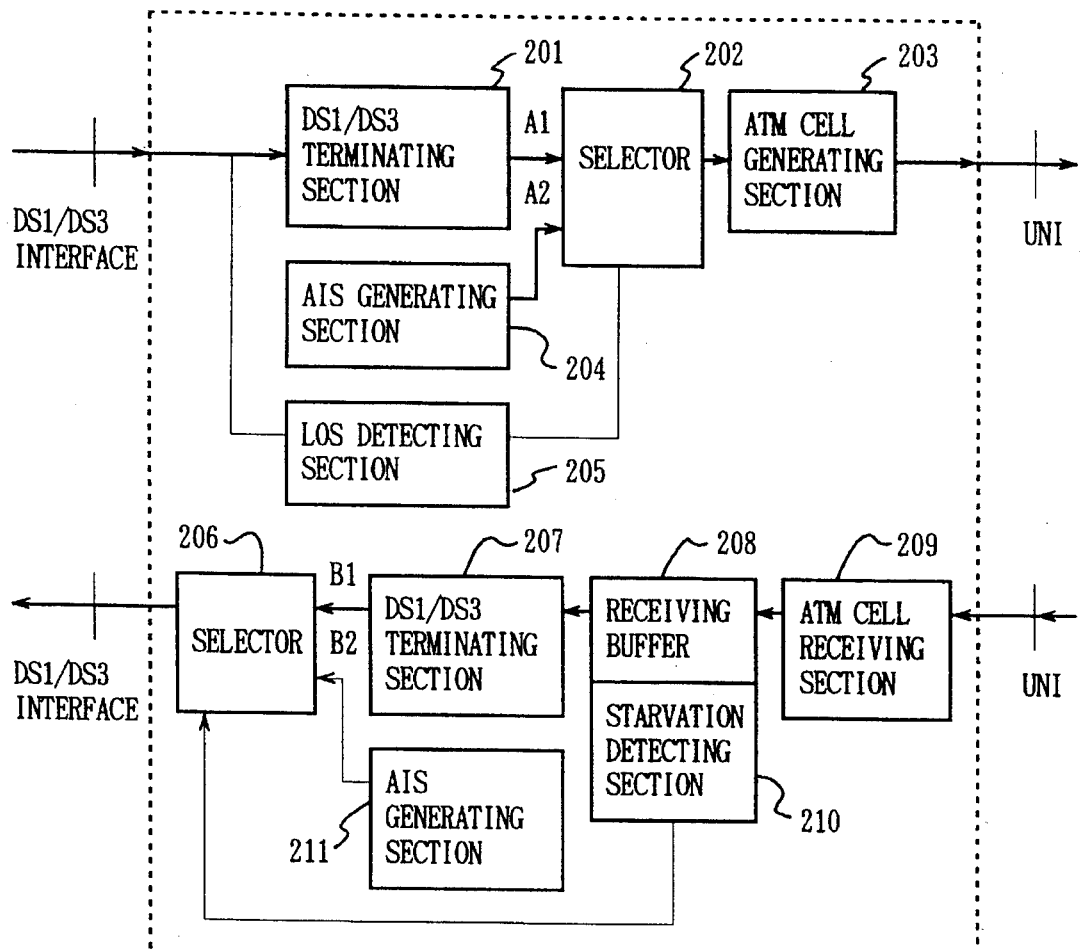
Figure 26:
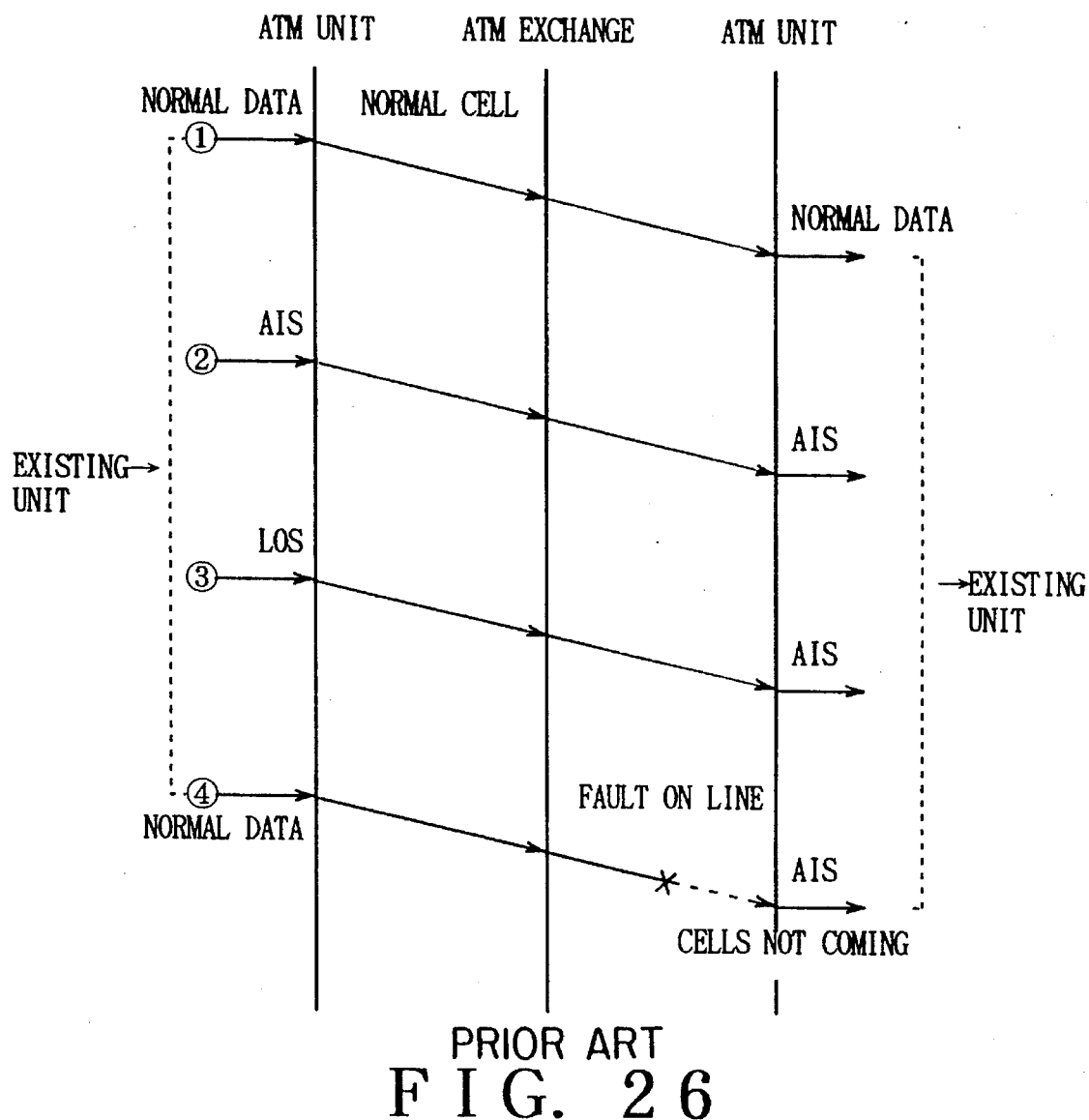
FIG. 26 is a diagram showing a transmission sequences of an AIS signal in the prior art communication network.

The interface DS1 (B) transmits the DS1 signal received from the ATM unit (B) 5 to the PBX (B) 7 (see (1) in FIG. 23). The same applies to a case when the signal is transmitted from the PBX (B) 7 to the PBX (A) 6. Thereby the signal may be transmitted/received quickly between the PBX (A) 6 and the PBX (B) 7.

Next, operation steps of the ATM unit when a loss of service occurs will be explained.

Figure 20:
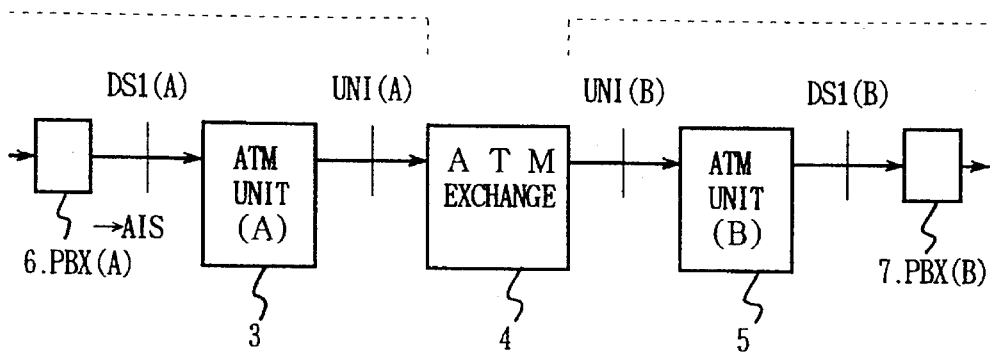
FIG. 20 is a block diagram showing a communication network when a loss of service occurs.

(1) When Fault Occurs on the PBX (A) 6 Side (see FIG. 20):

When a loss of service occurs on the PBX (A) 6 side, the PBX (A) 6 transmits an AIS signal. The AIS signal transmitted from the PBX (A) 6 is then transmitted to the ATM unit (A) 3 via the interface DS1 (A).

In the ATM unit (A) 3, the DS1 terminating section 3d receives the signal transmitted from the interface DS1 (A). At this time, the AIS detecting section 30 discriminates that the signal received by the DS1 terminating section 3d is an AIS signal and outputs a request to stop the transmission of the ATM cells to the ATM cell transmission stopping section 3b. The transmission stop request output from the AIS detecting section 30 is input to the ATM cell transmission stopping section 3b via the OR circuit 32.

Receiving the transmission stop request from the AIS detecting section 30, the ATM cell transmission stopping section 3b stops the transmission of the ATM cells output from ATM cell generating section 3a and at the same time, stops the ATM cell generating process of ATM cell generating section 3a for a certain period of time. Thereby the ATM unit (B) 5 cannot receive the ATM cells and the number of ATM cells stored in the receiving buffer 5b becomes zero.

Detecting that the number of ATM cells stored in the receiving buffer 5b has become zero, the starvation detecting section 5e outputs a request to transmit the AIS signal to the selector 5d and at the same time, outputs a request to generate the AIS signal to the AIS generating section 5f.

Receiving the AIS signal transmission request from the starvation detecting section 5e, the selector 5d switches the connection from that between the input terminal B1 and the output terminal to that between the input terminal B2 and the output terminal. At the same time, receiving the AIS signal generation request from the starvation detecting section 5e, the AIS generating section 5f generates the AIS signal and output it to the selector 5d. The AIS signal output from the AIS generating section 5f is transmitted from the selector 5d to the PBX (B) 7 via the interface DS1 (B) (see (2) in FIG. 23).

Thereby the AIS signal is informed to the addressee without being transmitted on the user interfaces UNI (A) and UNI (B) of the ATM communication system.

Figure 21:
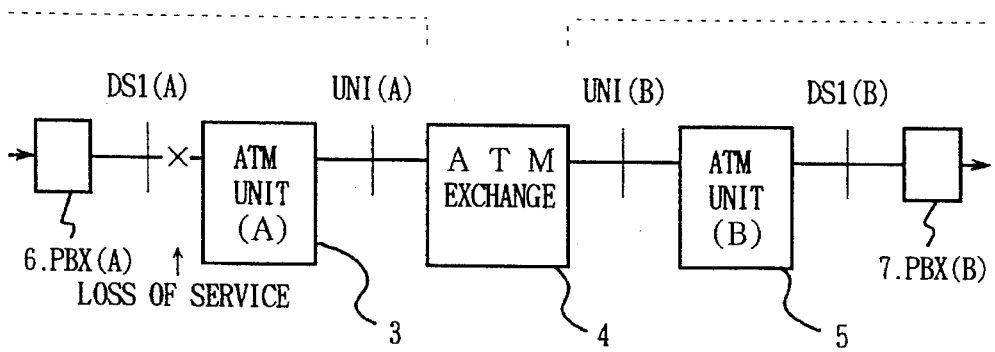
FIG. 21 is a block diagram showing the communication network when the loss of service occurs.

(2) When a Fault Occurs on Line Connecting the PBX (A) 6 and the ATM Unit (A) 3 (see FIG. 21):

When a loss of service occurs on the line connecting the PBX (A) 6 and the ATM unit (A) 3, the signal transmitted from the PBX (A) 6 becomes all "0" and is input to the ATM unit (A) 3.

The LOS detecting section 31 in the ATM unit (A) 3 detects that the signal input to the DS1 terminating section 3d is "0" successively for 100 to 250 bits. At this time, the LOS detecting section 31 outputs a request to stop the transmission of ATM cells to the ATM cell transmission stopping section 3b. This transmission stop request is input to the ATM cell transmission stopping section 3b via the OR circuit 32.

Receiving the transmission stop request from the LOS detecting section 31, the ATM cell transmission stopping section 3b stops the transmission of the ATM cells output from ATM cell generating section 3a and at the same time, stops the ATM generating process of ATM cell generating section 3a for a certain period of time. Thereby the ATM unit (B) 5 cannot receive the ATM cells and the number of ATM cells stored in the receiving buffer 5b becomes zero.

Detecting that the number of ATM cells stored in the receiving buffer 5b has become zero, the starvation detecting section 5e outputs a request to transmit the AIS signal to the selector 5d and at the same time, outputs a request to generate the AIS signal to the AIS generating section 5f.

Receiving the AIS signal transmission request from the starvation detecting section 5e, the selector 5d switches the connection from that between the input terminal B1 and the output terminal to that between the input terminal B2 and the output terminal. In the same time, receiving the AIS signal generation request from the starvation detecting section 5e, the AIS generating section 5f generates the AIS signal and output it to the selector 5d. The AIS signal output from the AIS generating section 5f is transmitted from the selector 5d to the PBX (B) 7 via the interface DS1 (B) (see (3) in FIG. 23).

Thereby the AIS signal is informed to the addressee without being transmitted on the user interfaces UNI (A) and UNI (B) of the ATM communication system.

Figure 22:
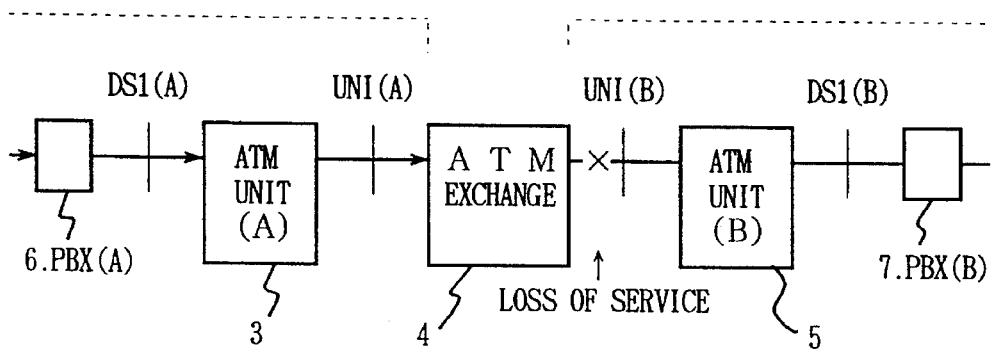
FIG. 22 is a block diagram showing the communication network when the loss of service occurs.

(3) When a Fault Occurs on Line Connecting the ATM Switching Unit (B) 4 and the ATM Unit (B) 5 (see FIG. 22):

When a loss of service occurs on the line connecting the ATM switching unit 4 and the ATM unit (B) 5, the ATM cells sent out from the ATM switching unit 4 cannot reach the ATM unit (B) 5. Thereby the ATM unit (B) 5 cannot receive the ATM cells and the number of ATM cells stored in the receiving buffer 5b becomes zero.

Detecting that the number of ATM cells stored in the receiving buffer 5b has become zero (starvation state), the starvation detecting section 5e outputs a request to transmit the AIS signal to the selector 5d and at the same time, outputs a request to generate the AIS signal to the AIS generating section 5f.

Receiving the AIS signal transmission request from the starvation detecting section 5e, the selector 5d switches the connection from that between the input terminal B1 and the output terminal to that between the input terminal B2 and the output terminal. In the same time, receiving the AIS signal generation request from the starvation detecting section 5e, the AIS generating section 5f generates the AIS signal and output it to the selector 5d. The AIS signal output from the AIS generating section 5f is transmitted from the selector 5d to the PBX (B) 7 via the interface DS1 (B) (see (4) in FIG. 23).

Thereby the AIS signal is informed to the addressee without being transmitted on the user interfaces UNI (A) and UNI (B) of the ATM communication system.

While preferred embodiments have been described, variations thereto will occur to those skilled in the art within the scope of the present inventive concepts which are delineated by the following claims.

What is claimed is:

1. An AIS (Alarm Indication Signal) transmission method in an ATM communication system, comprising:

providing a transmission side ATM unit for converting a signal received from a communication line on a transmission side into fixed length ATM cells and for transmitting the ATM cells to a receiving side via an ATM switching unit;

providing a receiving side ATM unit for decomposing the ATM cells received from said transmission side ATM unit to restore the cells into a signal transmittable on a communication line on the receiving side and for sending out the signal on said communication line on the receiving side;

monitoring by said transmission side ATM unit the signal transmitted from said communication line on the transmission side and stopping a transmission of the ATM cells for a certain period of time when an AIS (Alarm Indicating Signal) signal indicating a loss of service on the transmission side is received;

monitoring by said receiving side ATM unit the ATM cells transmitted from said transmission side ATM unit and generating and sending out an AIS (Alarm Indication signal) signal to said communication line on the receiving side by recognizing said loss of service on the transmission side when receiving of said ATM cells is stopped for the certain period of time.

2. The AIS transmission method in the ATM communication system according to claim 1, further comprising executing by said transmission side ATM unit:

an ATM cell generating step for converting the signal received from said communication line on the transmission side into ATM cells and for transmitting the ATM cells to said receiving side ATM unit;

a signal analyzing step for discriminating an attribute and normality of the signal transmitted from said communication line on the transmission side to detect whether or not the AIS signal is contained in an analyzed signal; and an ATM cell transmission stopping step for stopping the transmission of ATM cells for a certain period of time when the AIS signal is detected in said signal analyzing step.

3. The AIS transmission method in the ATM communication system according to claim 2, wherein said signal analyzing step comprises steps of:

discriminating an attribute of the signal received from said communication line on the transmission side to detect whether said signal is an AIS signal indicating a loss of service on the transmission side, and issuing a cell stop command for stopping the transmission of ATM cells when the AIS signal is detected; and said ATM cell transmission stopping step includes a step of stopping the generation and transmission of the ATM cells for a certain period of time when said cell stop command is issued.

4. The AIS transmission method in the ATM communication system according to claim 2, wherein said signal analyzing step comprises steps of:

analyzing the signal received from said communication line on the transmission side to detect whether normal data is stored, and issuing a cell stop command when a signal indicating "0s" successively for a certain number of bits is detected; and said ATM cell transmission stopping step includes a step of stopping the generation and transmission of the ATM cells for a certain period of time when said cell stop command is issued.

5. The AIS transmission method in the ATM communication system according to claim 2, wherein said signal analyzing step includes:

an AIS detecting step for analyzing the signal transmitted from said communication line on the transmission side to detect whether said signal is an AIS signal indicating a loss of service on the transmission side; and a LOS detecting step for analyzing the signal transmitted from said communication line on the transmission side to discriminate whether the signal is a signal indicating "0s" successively for a certain number of bits.

6. The AIS transmission method in the ATM communication system according to claim 1, further comprising executing by said receiving side ATM unit:

an ATM cell receiving step for receiving the ATM cells transmitted from said transmission side ATM unit;

an ATM cell storing step for temporarily storing the ATM cells received by said ATM cell receiving step in a receiving buffer and for appropriately outputting the cells from said receiving buffer;

an ATM cell decomposing step for decomposing the ATM cells output in said ATM cell storing step to restore to a signal transmittable on said communication line on the receiving side;

a starvation detecting step for monitoring the storage state of said receiving buffer and for issuing an AIS transmission command when it is detected that no ATM cells are stored;

an AIS generating step for generating the AIS signal indicating a loss of service in accordance with the AIS transmission command issued in said starvation detecting step; and a signal sending step for sending the AIS signal generated in said AIS generating step to said communication line on the receiving side.

7. The AIS transmission method in the ATM communication system according to claim 6, wherein said signal sending step comprises steps of:

sending the signal restored in said cell decomposing step to said communication line on the receiving side when at least one ATM cell is stored in said receiving buffer; and stopping the transmission of the signal output in said cell decomposing step and at the same time, transmitting the AIS signal generated in said AIS generating step to said communication line on the receiving side when no ATM cell is stored in said receiving buffer and said starvation detecting step issued the AIS transmission command.

8. An AIS (Alarm Indication Signal) transmission method in an ATM communication system, comprising:

providing a transmission side ATM unit for converting a signal received from a communication line on a transmission side into fixed length ATM cells and for transmitting the ATM cells to a receiving side via an ATM switching unit; and providing a receiving side ATM unit for decomposing the ATM cells received from said transmission side ATM unit to restore the cells into a signal transmittable on a communication line on the receiving side and for sending out the signal on said communication line on the receiving side;

monitoring by said transmission side ATM unit whether normal data is contained in the signal received from the communication line on the transmission side and stopping a transmission of ATM cells to said receiving side ATM unit for a certain period of time when it is detected that said signal does not contain normal data;

monitoring by said receiving said ATM unit a process of receiving the ATM cells transmitted from said transmission side ATM unit and generating and sending out an AIS (Alarm Indication Signal) signal indicating a loss of service on the transmission side to said communication line on the receiving side by recognizing that the process of receiving of said ATM cells is stopped for the certain period of time.

9. The AIS transmission method in the ATM communication system according to claim 8, further comprising executing by said transmission side ATM unit:

an ATM cell generating step for converting the signal received from said communication line on the transmission side into ATM cells and for transmitting the ATM cells to said receiving side ATM unit;

a signal analyzing step for discriminating an attribute and normality of the signal transmitted from said communication line on the transmission side to detect whether or not the AIS signal is contained in an analyzed signal; and an ATM cell transmission stopping step for stopping the transmission of ATM cells for a certain period of time when the AIS signal is detected in said signal analyzing step.

10. The AIS transmission method in the ATM communication system according to claim 8, further comprising executing by said receiving side ATM unit:

an ATM cell receiving step for receiving the ATM cells transmitted from said transmission side ATM unit;

an ATM cell storing step for temporarily storing the ATM cells received by said ATM cell receiving step in a receiving buffer and for appropriately outputting the cells from said receiving buffer;

an ATM cell decomposing step for decomposing the ATM cells output in said ATM cell storing step to restore to a signal transmittable on said communication line on the receiving side;

a starvation detecting step for monitoring the storage state of said receiving buffer and for issuing an AIS transmission command when it is detected that no ATM cells are stored;

an AIS generating step for generating the AIS signal indicating a loss of service in accordance with the AIS transmission command issued in said starvation detecting step; and a signal sending step for sending the AIS signal generated in said AIS generating step to said communication line on the receiving side.

11. An AIS (Alarm Indication Signal) transmission unit in an ATM communication system wherein a transmission side ATM unit is disposed between a communication line on a transmission side and a switching unit, and a receiving side ATM unit is disposed between said switching unit and a communication line on a receiving side; the transmission side ATM unit comprising:

ATM cell generating means for converting a signal received from said communication line on the transmission side into ATM cells and for transmitting the cells to said receiving side ATM unit via said ATM switching unit;

signal analyzing means for analyzing the signal transmitted from said communication line on the transmission side to detect whether an analyzed signal is an AIS (Alarm Indication Signal) signal indicating a loss of service on the transmission side and for issuing an ATM cell stop command when said signal is the AIS signal; and ATM cell transmission stopping means for stopping an operation of said ATM cell generating means for a certain period of time when the ATM cell stop command is issued from said signal analyzing means; and said receiving said ATM unit comprising:

ATM cell receiving means for receiving the ATM cells transmitted from said transmission side ATM unit;

a receiving buffer for temporarily storing the ATM cells received by said ATM cell receiving means and for appropriately outputting the ATM cells;

ATM cell decomposing means for decomposing the ATM cells output by said receiving buffer to restore to a signal transmittable to said communication line on the receiving side;

starvation detecting means for monitoring a storage state of said receiving buffer and for issuing an AIS transmission command when said starvation detecting means detects that no ATM cells are stored in said receiving buffer;

AIS generating means for generating the AIS signal indicating a loss of service in accordance with the AIS transmission command issued by said starvation detecting means; and signal sending means for sending the AIS signal generated by said AIS generating means to said communication line on the receiving side.

12. The AIS transmission unit in the ATM communication system according to claim 11, wherein said signal analyzing means monitors an attribute of the signal received from said communication line on the transmission side and issues the ATM cell stop command to said ATM cell transmission stopping means when said signal analyzing means detects the AIS signal indicating a loss of service on the transmission side; and said ATM cell transmission stopping means stops the operation of said ATM cell generating means for a certain period of time.

13. The AIS transmission unit in the ATM communication system according to claim 11, wherein said signal analyzing means discriminates whether normal data is stored in the signal received from said communication line on the transmission side and issues the ATM cell stop command when said signal analyzing means detects a signal indicating "0s" successively for a certain number of bits in the signal; and said ATM cell transmission stopping means stops the generation and transmission of the ATM cells when said ATM cell stop command is received thereby.

14. The AIS transmission unit in the ATM communication system according to claim 11, wherein said signal analyzing means comprises:

an AIS detecting section for monitoring an attribute of the signal transmitted from said communication line on the transmission side to detect the AIS signal indicating a loss of service on the transmission side; and a LOS detecting section for monitoring the signal transmitted from said communication line on the transmission side to detect a signal indicating "0s" successively for a certain number of bits.

15. The AIS transmission system in the ATM communication system according to claim 11, wherein said signal sending means sends the signal restored in said cell decomposing means to said communication line on the receiving side when at least one ATM cell is stored in said receiving buffer; and stops the transmission of the signal output from said cell decomposing means and at the same time, transmits the AIS signal generated in said AIS generating means to said communication line on the receiving side when no ATM cell is stored in said receiving buffer and said starvation detecting means issues the AIS sending command.

16. A transmission side ATM unit in an ATM communication system disposed between a communication line on a transmission side and an ATM switching unit, comprising:

ATM cell generating means for converting a signal received from said communication line on the transmission side into fixed length ATM cells and for transmitting the ATM cells to an addressee via said ATM switching unit;

signal analyzing means for analyzing the signal transmitted from said communication line on the transmission side to detect whether said signal is an AIS (Alarm Indication Signal) signal indicating a loss of service on the transmission side; and ATM cell transmission stopping means for stopping an operation of said ATM cell generating means for a certain period of time when said signal analyzing means detects the AIS signal.

17. The ATM communication system according to claim 16, wherein a receiving side ATM unit is disposed between said ATM switching unit and a communication line on a receiving side at the addressee of said transmission side ATM unit, said receiving side ATM unit comprising:

ATM cell receiving means for receiving the ATM cells transmitted from said transmission side ATM unit;

a receiving buffer for temporarily storing the ATM cells received by said ATM cell receiving means and for appropriately outputting the ATM cells;

an ATM cell decomposing means for decomposing the ATM cells output from said ATM cell storing means to restore to a signal transmittable on said communication line on the receiving side;

starvation detecting means for monitoring a storage state of said receiving buffer and for issuing an AIS transmission command when said starvation detecting means detects that no ATM cells is stored;

AIS generating means for generating the AIS signal indicating a loss of service in accordance to the AIS transmission command issued by said starvation detecting means; and a signal sending means for sending the AIS signal generated by said AIS generating means to said communication line on the receiving side.

18. A transmission side ATM unit in an ATM communication system disposed between a communication line on a transmission side and a ATM switching unit, comprising:

ATM cell generating means for converting a signal received from said communication line on the transmission side into fixed length ATM cells and for transmitting the ATM cells to an addressee via said ATM switching unit;

signal analyzing means for analyzing the signal transmitted from said communication line on the transmission side to detect whether normal data is stored in the signal; and ATM cell transmission stopping means for stopping an operation of said ATM cell generating means for a certain period of time when said signal analyzing means detects a signal in which abnormal data is stored.

19. The ATM communication system according to claim 18, wherein a receiving side ATM unit is disposed between said ATM switching unit and a communication line on a receiving side at the addressee of said transmission side ATM unit, said receiving side ATM unit comprising:

ATM cell receiving means for receiving the ATM cells transmitted from said transmission side ATM unit;

a receiving buffer for temporarily storing the ATM cells received by said ATM cell receiving means and for appropriately outputting the ATM cells;

an ATM cell decomposing means for decomposing the ATM cells output from said ATM cell storing means to restore to a signal transmittable on said communication line on the receiving side;

starvation detecting means for monitoring a storage state of said receiving buffer and for issuing an AIS transmission command when it is detected that no ATM cells are stored;

AIS generating means for generating the AIS signal indicating a loss of service in accordance to the AIS transmission command issued by said starvation detecting means; and a signal sending means for sending the AIS signal generated by said AIS generating means to said communication line on the receiving side.

* * * * *